(12) United States Patent
Matthews et al.

(10) Patent No.: US 7,487,232 B1
(45) Date of Patent: Feb. 3, 2009

(54) SWITCH MANAGEMENT SYSTEM AND METHOD

(75) Inventors: Abraham R. Matthews, San Jose, CA (US); Anna Berenberg, Los Altos, CA (US)

(73) Assignee: Fortinet, Inc., Sunnyvale, CA (US)

( * ) Notice: Subject to any disclaimer, the term of this patent is extended or adjusted under 35 U.S.C. 154(b) by 605 days.

(21) Appl. No.: 09/663,483

(22) Filed: Sep. 13, 2000

(51) Int. Cl.
*G06F 15/173* (2006.01)

(52) U.S. Cl. ...................................... 709/223

(58) Field of Classification Search ................. 709/250, 709/235, 229, 226, 236, 238, 223, 219; 705/79, 705/77; 395/800
See application file for complete search history.

(56) References Cited

U.S. PATENT DOCUMENTS

| | | | |
|---|---|---|---|
| 5,473,599 A | 12/1995 | Li et al. | |
| 5,745,778 A * | 4/1998 | Alfieri | 712/1 |
| 5,875,290 A | 2/1999 | Bartfai et al. | |
| 6,098,110 A * | 8/2000 | Witkowski et al. | 709/249 |
| 6,169,793 B1* | 1/2001 | Godwin et al. | 379/221.13 |
| 6,260,073 B1* | 7/2001 | Walker et al. | 709/249 |
| 6,266,695 B1* | 7/2001 | Huang et al. | 709/223 |
| 6,330,602 B1* | 12/2001 | Law et al. | 709/224 |
| 6,338,092 B1* | 1/2002 | Chao et al. | 709/236 |
| 6,405,262 B1 | 6/2002 | Vogel et al. | |
| 6,414,595 B1 | 7/2002 | Scrandis et al. | |
| 6,674,756 B1* | 1/2004 | Rao et al. | 709/229 |
| 6,883,170 B1 | 4/2005 | Garcia | |
| 7,096,495 B1* | 8/2006 | Warrier et al. | 709/224 |
| 2001/0048661 A1 | 12/2001 | Clear et al. | |
| 2004/0095934 A1 | 5/2004 | Cheng et al. | |

OTHER PUBLICATIONS

Kapustka, K. et al., "CoSine Communications Moves VPNs 'Into the Cloud' with the Leading Managed IP Service Delivery Platform", CoSine Communications http://www.cosinecom.com/news/pr_5_24.html, 5 p., (1999).*
Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.

(Continued)

*Primary Examiner*—Jeffrey Pwu
*Assistant Examiner*—Benjamin R Bruckart
(74) *Attorney, Agent, or Firm*—Hamilton, DeSanctis & Cha LLP

(57) ABSTRACT

A system and method of managing a switch includes installing a switch having a plurality of processor elements, installing an operating system on each processor element, creating a system virtual router and configuring the processor elements from the system virtual router.

21 Claims, 30 Drawing Sheets

OTHER PUBLICATIONS

Office action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed on Aug. 10, 2007 for U.S. Appl. No. 10/163,260.
Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Office Action dated Sep. 11, 2007 for U.S. Appl. No. 09/661,637.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.
Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Supplemental Amendment and Response filed on Sep. 17, 2007 for U.S. Appl. No. 09/663,457.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.

Amendment and Response filed on Feb. 7, 2006 for U.S. Appl. No. 09/663,484.

Office Action dated Apr. 6, 2005 for U.S. Appl. No. 09/663,484.

Office Action dated Aug. 1, 2007 for U.S. Appl. No. 10/163,260.

Amendment and Response filed on May 23, 2007 for U.S. Appl. No. 10/163,260.

Office Action dated Apr. 13, 2007 for U.S. Appl. No. 10/163,260.

Amendment and Response filed on Mar. 13, 2007 for U.S. Appl. No. 10/163,260.

Office Action dated Dec. 21, 2006 for U.S. Appl. No. 10/163,260.

Amendment and Response filed on Sep. 18, 2006 for U.S. Appl. No. 10/163,260.

Office Action dated May 18, 2006 for U.S. Appl. No. 10/163,260.

Office Action dated Aug. 22, 2007 for U.S. Appl. No. 10/650,298.

* cited by examiner

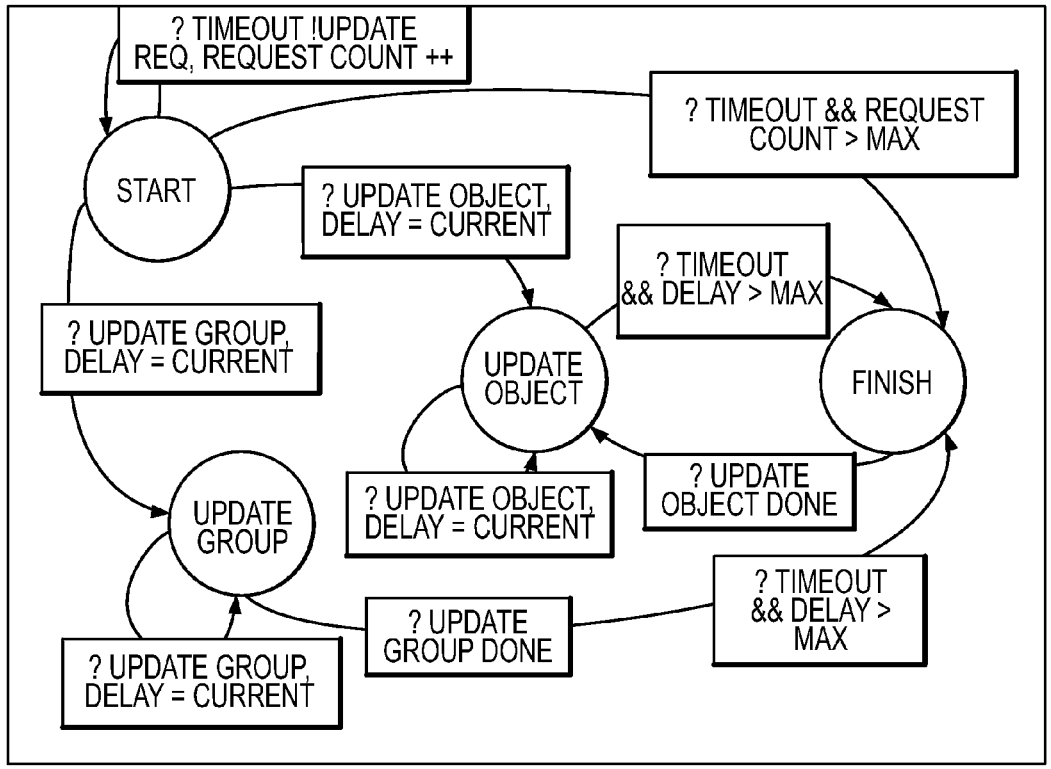

| STATE | EVENT | ACTION |
|---|---|---|
| START | TIMEOUT && (REQUEST COUNT < MAX) | SEND UPDATE REQUEST |
| START | TIMEOUT && (REQUEST COUNT > MAX) | PEER DID NOT REPLY. UPDATE FAILED TRANSIT TO FINISH STATE. |
| START | RECV UPDATE GROUP MESSAGE | TRANSIT TO UPDATE GROUP STATE. SET LAST UPDATE EQUAL TO THE CURRENT TIME. |
| START | RECV UPDATE OBJECT MESSAGE | TRANSIT TO UPDATE OBJECT STATE. SET LAST UPDATE EQUAL TO THE CURRENT TIME. |

FIG.11

| STEP | LOCAL CEP OBJECT | LOCAL IPNOS | LOCAL RM/LQ | REMOTE RM/LQ | REMOTE IPNOS | REMOTE CEP OBJECT |
|---|---|---|---|---|---|---|
| 1 | obj_associate_channel(local_chan, local_cep_id, remote_cep_id) | | | | | |
| 2 | | /* Allocate remote LQ */<br><br>resmng_alloc_resource (RESOURCE_DATA_CONNECTION, 0, remote_cep_id -> object.address_space_id, &remote_lq) | | | | |
| 3 | | | | Lookup resource tag and allocate from *remote* LQ | | |
| 4 | | /* Ask remote LQ to allocate local LQ*/<br><br>status = omori_obj_ioctl_by_id (&remote_lq,<br><br>remote_lq.group, OBJ_CTL_CODE_ANY (LQUSER_BIND), &lq_bind, sizeof (lq_bind));<br><br>memcpy (&local_lq, | | | | |

FIG.16a

|   |   |   |   |   |   |
|---|---|---|---|---|---|
|   |   | &lq_bind.lq_object.local, sizeof (object_id_t)); |   |   |   |
| 5 |   |   |   | Use resmng_alloc_resource0 to allocate *local* LQ |   |
| 6 |   |   | Lookup resource tag and allocate from *local* LQ |   |   |
| 7 |   |   |   | Return allocated *local* LQ |   |
| 8 |   | /* Bind Local and Remote LQs*/<br><br>status = omori_obj_ioctl_by_id (&local_lq,<br><br>local_lq.group,<br><br>OBJ_CTL_CODE_ANY (LQUSER_BIND),<br><br>&lq_bind, sizeof (lq_bind)); |   |   |   |
| 9 |   |   | Setup LQ-API parameters to point to *remote* LQ | Setup LQ-API parameters to point to *local* LQ |   |
| 10 |   | /* Push local LQ as a service onto local channel*/<br><br>status = omori_obj_ioctl_by_id |   |   |   |

FIG.16b

| | | | | | | |
|---|---|---|---|---|---|---|
| | | (&local_lq, local_lq.group, OBJ_CTL_C ODE_ANY (LQUSER_BI ND), &lq_bind, sizeof (lq_bind)); | | | | |
| 11 | Lookup CEP address | | | | | |
| 12 | | | | | /* Push remote LQ as a service onto remote channel*/<br><br>status = omori_obj_ioc tl_by_id (&remote_lq,<br><br>local_lq.group,<br><br>OBJ_CTL_C ODE_ANY (LQUSER_BI ND),<br><br>&lq_bind, sizeof (lq_bind)); | |
| 13 | | | | | | Lookup CEP address |

FIG.16c

| STEP | OMCD | OMORIG | OMORI | OBJECT |
|---|---|---|---|---|
| 0 | Create unique vr_descriptor_t for specified VPN, fills with default value and adds VR to the list of VR per VPN. | | | |
| 1 | Requests group creation for specified VR with class_group_selector on specified address space. | | | |

FIG.19a

| | | | | |
|---|---|---|---|---|
| 2 | | Create group 1; create object id link of selected class. Validate address space id on capability to service specified object class. Send request CREATE_OBJECT to capable OMORI (2). Wait for OMORI reply. | | |
| 3 | | | Receive CREATE_OBJECT request for specified group. Lookup a group; not found. Create group 1; Create object descriptor of selected class. Call the class constructor. | |
| 4 | | Receive MV_OBJ_TO_GROUP request; add object id to OMORIG Database | add object to the group, send MV_OBJ_TO_GROUP request to OMORIG | |
| 5 | | | | Create and initialize an object; return SUCCESS or FAILURE. |
| 6 | | | If FAILURE remove object from the group, send MV_OBJ_TO_GROUP and RM_OBJ_FROM_GROUP to OMORIG; ================ Else send reply for CREATE_OBJECT request to OMORIG | |
| 7 | | Receive MV_OBJ_TO_GROUP request, move object to the group 0(OM_BASE_GROUP); Receive RM_OBJ_FROM_GROUP request; remove object id from OMORIG | | |

FIG.19b

|   |   | Database ================ |   |   |
|---|---|---|---|---|
| 8 |   | Receive Object CREATE reply. Signal to OMCD |   |   |
| 9 | VR created, return status to user |   |   |   |
| 10 |   | Send ACTIVATE object message to OMORI (2) |   |   |
| 11 |   |   | Receive ACTIVATE object message. For all the objects of this group send generic IOCTL ACTIVATE_OBJECT | Activate object, Do object-specific action to make it active, operational |

| STEP | OMCD | OMORIG | OMORI | OBJECT |
|---|---|---|---|---|
| 0 | Create unique vr_descriptor_t for specified VPN, fills with default value and adds VR to the list of VR per VPN. | | | |
| 1 | Requests group creation for specified VR with class_group_selector on specified address space. | | | |
| 2 | | Create group 1; create object id link of selected class. Validate address space id on capability to service specified object class. Send request CREATE_OBJECT to capable OMORIs (1 and 2). Wait for reply from both OMORIs. | | |
| 3 | | | Receive CREATE_OBJECT request for specified group. Lookup a group; not found. Create group 1; Create object descriptor of selected class. Call the class constructor. | |
| 4 | | Receive MV_OBJ_TO_GROUP request; add object id to OMORIG Database | add object to the group, send MV_OBJ_TO_GROUP request to OMORIG | |
| 5 | | | | Create and initialize an object; return SUCCESS or FAILURE |
| 6 | | | If FAILURE remove object from the group, send MV_OBJ_TO_GROUP and RM_OBJ_FROM_GROUP to OMORIG; | |

FIG.21a

| | | | | |
|---|---|---|---|---|
| | | | Else send reply for CREATE_OBJECT request to OMORIG | |
| 7 | | Receive MV_OBJ_TO_GROUP request, move object to the group O(OM_BASE_GROUP); Receive RM_OBJ_FROM_GROUP request; remove object id from OMORIG Database | | |
| 8 | | Receive Object CREATE reply. If all the object replied then signal to OMCD, otherwise do nothing | | |
| 8 | VR created, return status to user | | | |
| 10 | | Send ACTIVATE object message to every OMORI (1,2) where objects were created | | |
| 11 | | | Receive ACTIVATE object message. For all the objects of this group send generic IOCTL ACTIVATE_OBJECT | |
| 12 | | | | Activate object, Do object-specific action to make it active, operational |

FIG.21b

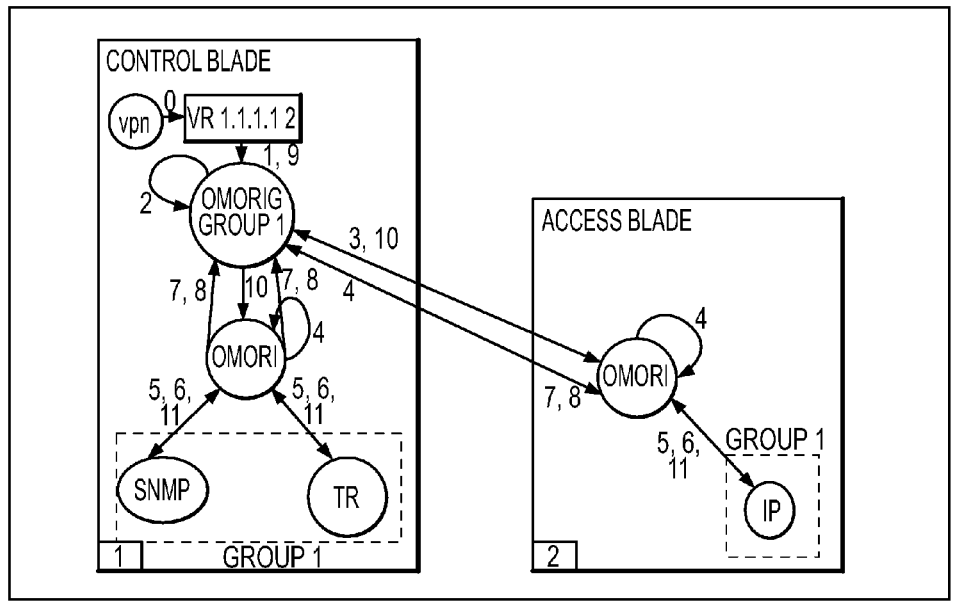

FIG.22

| STEP | OMCD | OMORIG | OMORI | OBJECT |
|---|---|---|---|---|
| 0 | For specified VPN and VR lookup vr_descriptor. Call OMORIG to delete corresponding group. | | | |
| 1 | | Lookup group descriptor by specified id. Filter OMORIs which have objects to be destroyed(which belong to the specified group) | | |
| 2 | | | Receive DESTROY_GROUP_OBJECTS request for specified group. Lookup a group; Send generic IOCTL STOP_OBJECT to every local object, which belongs to the group | |
| 3 | | | | Stop operating, destroy all connections with other objects |

FIG.23a

| | | | | |
|---|---|---|---|---|
| 4 | | | Send generic IOCTL DESTROY_OBJECT to every local object, which belongs to the group | |
| 5 | | | | Free itself |
| 6 | | | If FAILURE remove object from the group, send MV_OBJ_TO_GROUP and RM_OBJ_FROM_GROUP to OMORIG; | |
| 7 | | Receive MV_OBJ_TO_GROUP request, move object to the group O(OM_BASE_GROUP); Receive RM_OBJ_FROM_GROUP request; remove object id from OMORIG Database | | |
| 8 | | Receive Object DESTROY_GROUP_OBJECTS. Subtract number of destroyed objects from the total number of objects in the group (VR). If all objects destroyed then signal to OMCD, otherwise do nothing. | | |
| 8 | VR destroyed, return status to user | | | |

FIG.23b

SWITCH MANAGEMENT SYSTEM AND METHOD

FIELD OF THE INVENTION

The present invention is related to networking systems, and more particularly to a system and method for managing a switch within a wide area network (WAN).

BACKGROUND INFORMATION

Internet or WAN service providers are operating in a crowded marketplace where cost effectiveness is critical. Operational costs present a significant challenge to service providers. Cumbersome, manual provisioning processes are the primary culprits. Customer orders must be manually entered and processed through numerous antiquated back-end systems that have been pieced together. Once the order has been processed, a truck roll is required for onsite installation and configuration of Customer Premises Equipment (CPE), as well as subsequent troubleshooting tasks.

Presently, the delivery of firewall services requires the deployment of a specialized piece of Customer Premises Equipment (CPE) to every network to be protected. This model of service delivery creates an expensive up-front capital investment, as well as significant operational expenses that are associated with onsite installation and management of thousands of distributed devices. The results are service delivery delays, increased customer start-up costs and/or thinner service provider margins.

The slow and expensive process of deploying firewall services cuts into margins and forces significant up-front charges to be imposed on the customer. In order to be successful in today's market, service providers must leverage the public network to offer high-value, differentiated services that maximize margins while controlling capital and operational costs. These services must be rapidly provisioned and centrally managed so that time-to-market and, more importantly, time-to-revenue are minimized. Traditional methods of data network service creation, deployment, and management present significant challenges to accomplishing these goals, calling for a new network service model to be implemented.

Enterprise customers are increasingly demanding cost-effective, outsourced connectivity and security services, such as Virtual Private Networks (VPNs) and managed firewall services. Enterprise networks are no longer segregated from the outside world; IT managers are facing mounting pressure to connect disparate business units, satellite sites, business partners, and suppliers to their corporate network, and then to the Internet. This raises a multitude of security concerns that are often beyond the core competencies of enterprise IT departments. To compound the problem, skilled IT talent is an extremely scarce resource. Service providers, with expert staff and world-class technology and facilities, are well positioned to deliver these services to enterprise customers.

What is needed is a system and method for providing managed network services that are customizable for each customer's need. Furthermore, what is needed is a system and method for controlling such managed network services.

SUMMARY OF THE INVENTION

According to one aspect of the present invention, a system and method of managing a switch includes installing a switch having a plurality of processor elements, installing an operating system on each processor element, creating a system virtual router and configuring the processor elements from the system virtual router.

According to another aspect of the present invention, a switch management system includes an object manager and a distributed management layer, wherein the object manager communicates with objects through the distributed management layer.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which:

FIG. 11 illustrates a global database state machine in the form of both a global database state transition diagram and table in accordance with one embodiment of the present invention.

FIGS. 16A, B and C together represent a table that illustrates the steps for establishing a connection between a local CEP object and a remote CEP object according to one embodiment of the present invention.

FIGS. 19A, B and C together represent a table that illustrates the steps for creating a VR with a single object according to one embodiment of the present invention.

FIGS. 21A, B and C together represent a table that illustrates the steps for creating a VR with multiple objects according to one embodiment of the present invention.

FIG. 22 conceptually illustrates deletion of a VR with multiple objects according to one embodiment of the present invention.

FIGS. 23A and B together represent a table that illustrates the steps for deleting a VR with multiple objects according to one embodiment of the present invention.

DESCRIPTION OF THE PREFERRED EMBODIMENTS

Figure 1:
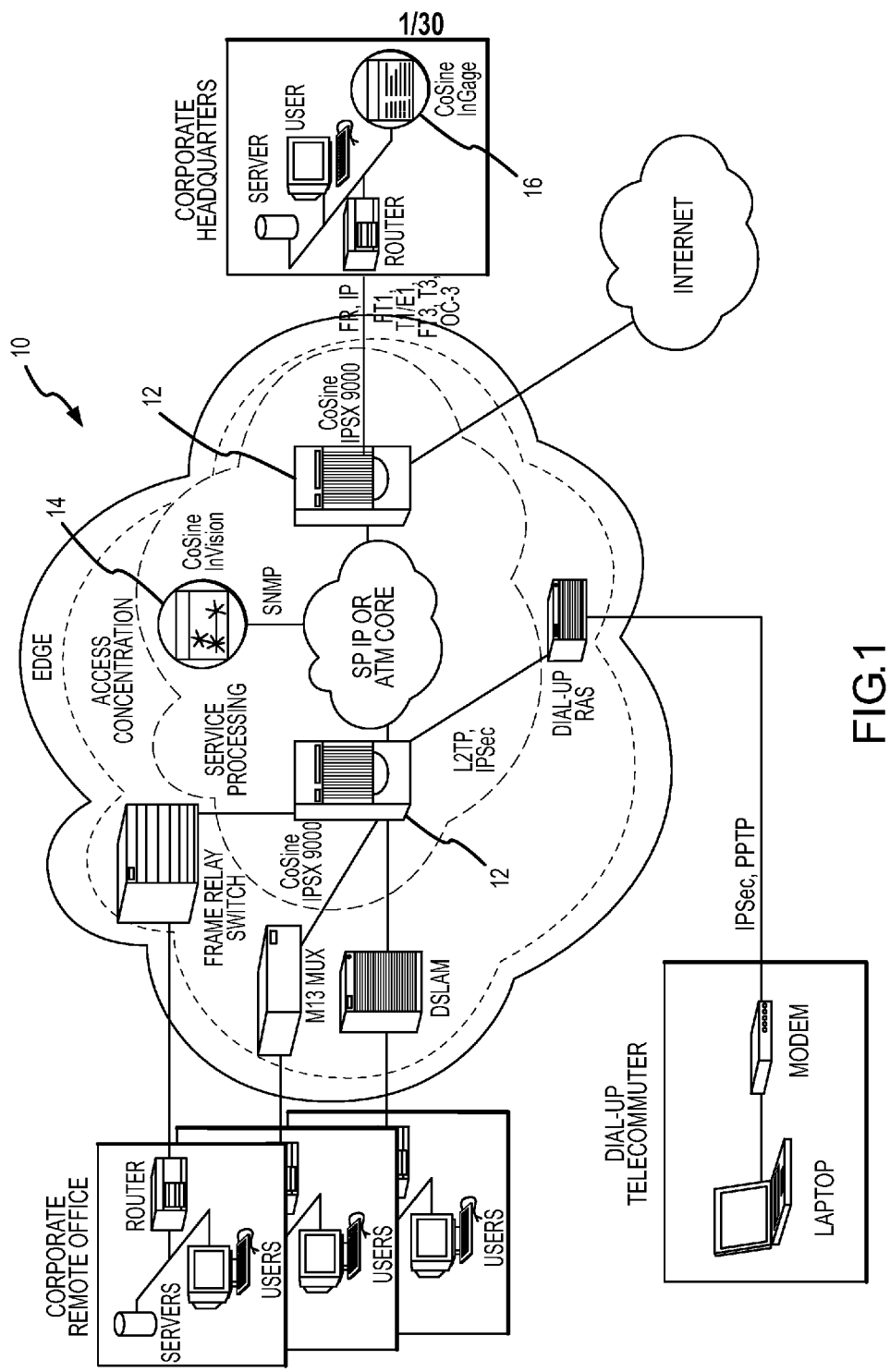
FIG. 1 conceptually illustrates an example of an IP Service Delivery Platform Application Architecture according to one embodiment of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

While IT managers clearly see the value in utilizing managed network services, there are still barriers to adoption. Perhaps the most significant of these is the fear of losing control of the network to the service provider. In order to ease this fear, a successful managed network service offering must provide comprehensive visibility to the customer, enabling them to view configurations and performance statistics, as well as to request updates and changes. By providing IT managers with powerful Customer Network Management (CNM) tools, one can bolster confidence in the managed network service provider and can actually streamline the service provisioning and maintenance cycle.

While service providers recognize the tremendous revenue potential of managed firewall services, the cost of deploying, managing and maintaining such services via traditional CPE-based methods is somewhat daunting. Service providers are now seeking new service delivery mechanisms that minimize capital and operational costs while enabling high-margin, value-added public network services that are easily provisioned, managed, and repeated. Rolling out a network-based managed firewall service is a promising means by which to accomplish this. Deploying an IP Service Delivery Platform in the service provider network brings the intelligence of a managed firewall service out of the customer premises and into the service provider's realm of control.

One such IP Service Delivery Platform 10 is shown in FIG. 1. In the embodiment shown in FIG. 1, IP Service Delivery Platform 10 includes three distinct components: an intelligent, highly scalable IP Service Processing Switch 12, a comprehensive Service Management System (SMS) 14 and a powerful Customer Network Management (CNM) system 16. Service Management System (SMS) 14 is used to enable rapid service provisioning and centralized system management. Customer Network Management (CNM) system 16 provides enterprise customers with detailed network and service performance systems and enables self-provisioning. At the same time, system 16 eases IT managers' fears of losing control of managed network services.

Figure 2:
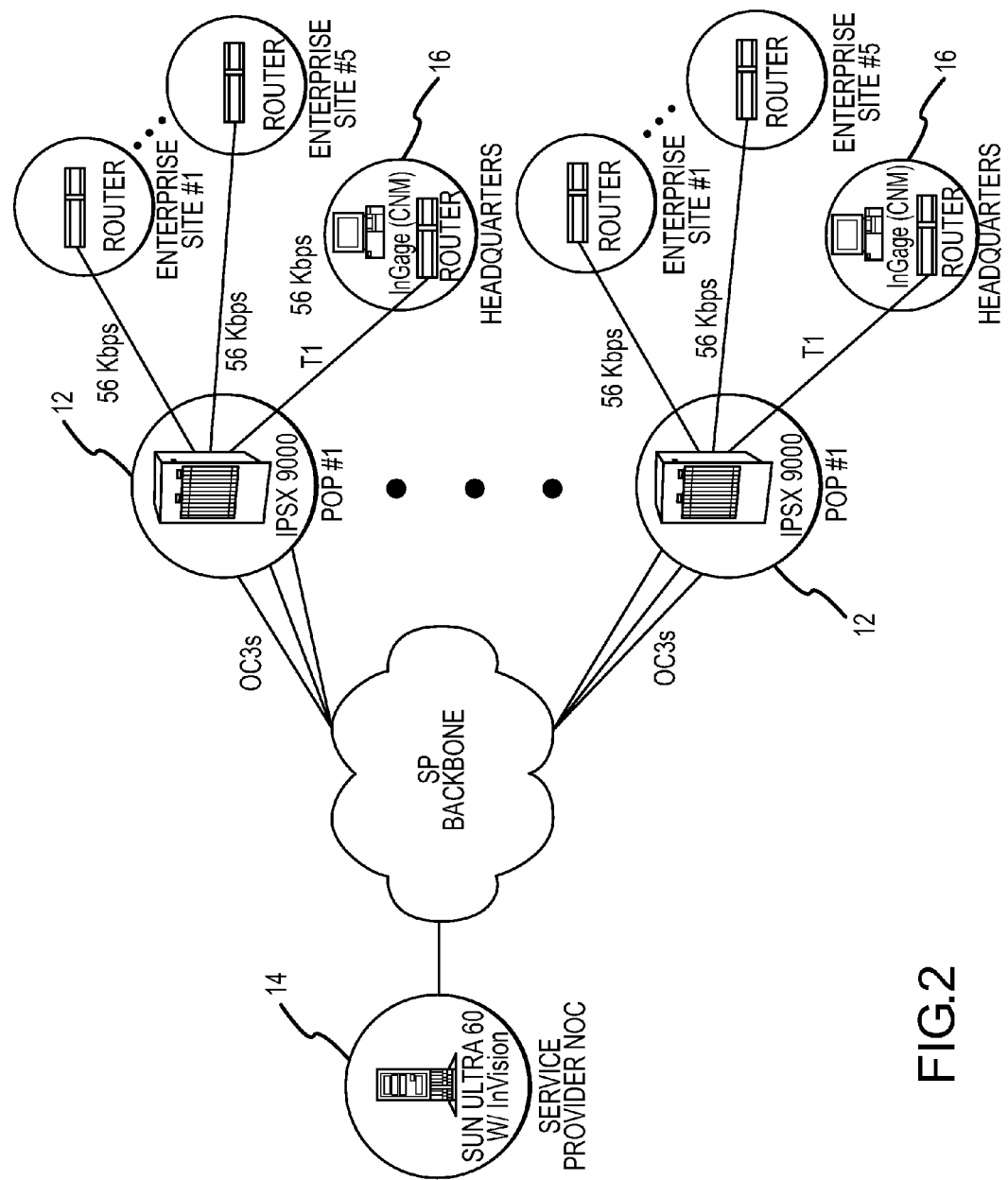
FIG. 2 conceptually illustrates a network-based managed firewall service model according to one embodiment of the present invention.
Figure 3:
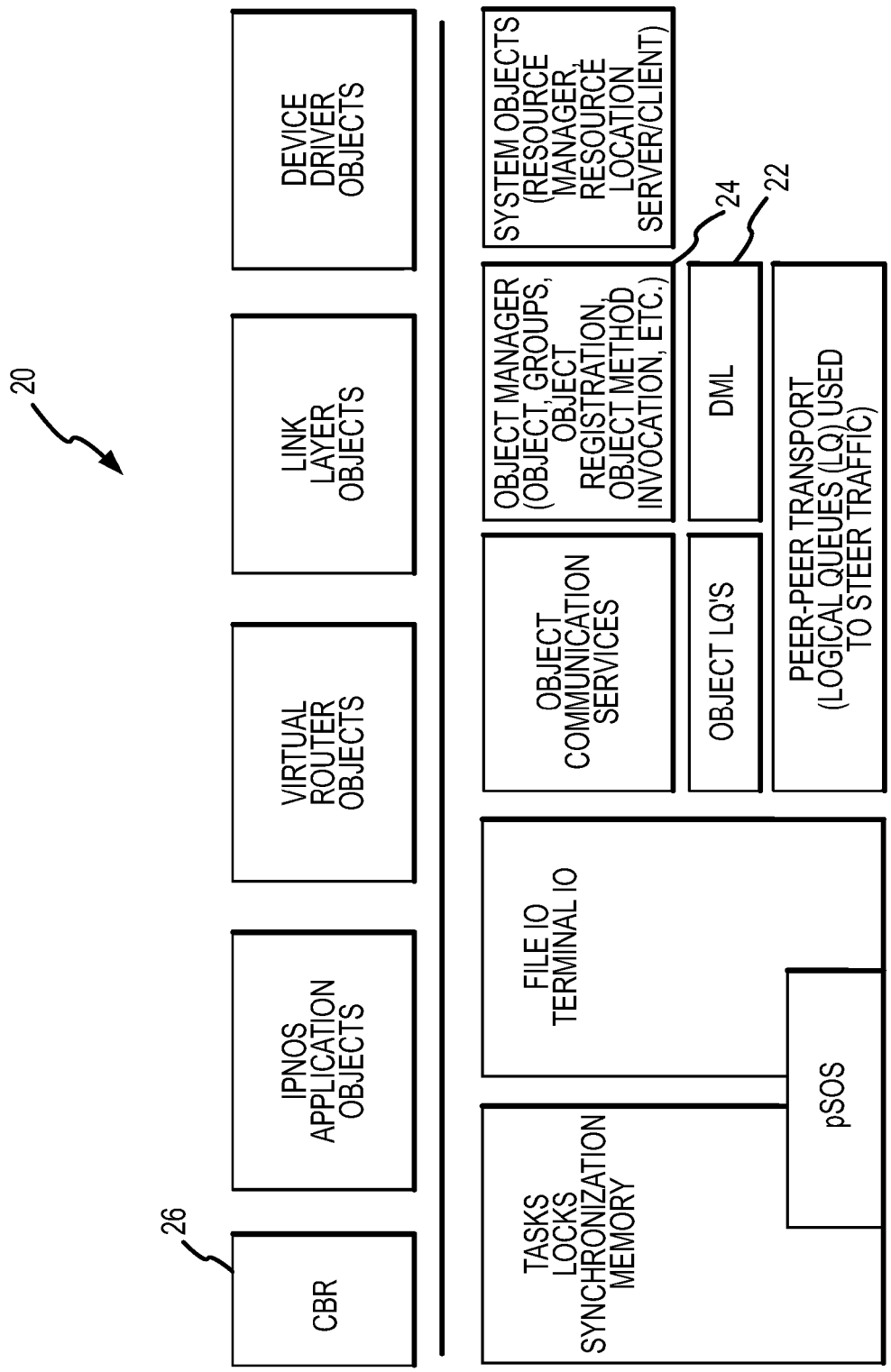
FIG. 3 is a block diagram illustrating various functional units of an IP network operating system (IPNOS) according to one embodiment of the present invention.

In one embodiment, such as is shown in FIG. 2 for a network-based managed firewall service model, the service provider replaces the high-capacity access concentration router at the POP with an IP Service Processing Switch 12. This is a higher-capacity, more robust, and more intelligent access switch, with scalable processing up to 100+ RISC CPUs. Just as with the access router, additional customer access capacity is added via installing additional port access blades to the IP Service Processing Switch chassis. Unlike conventional access routers, however, additional processor blades can be added to switch 12 to ensure wire-speed performance and service processing.

The intelligence resident in IP Service Processing Switch 12 eliminates the need to deploy CPE devices at each protected customer site. Deployment, configuration, and management of the managed firewall service all take place between IP Service Processing Switch 12 and its Service Management System 14. In the embodiment shown in FIG. 2, Service Management System 14 resides on a high-end UNIX platform at the service provider NOC.

In one embodiment, the customer has the ability to initiate service provisioning and augmentation via a web-based Customer Network Management tool residing, e.g., at the customer's headquarters site. This is an entirely different service delivery paradigm, requiring little or no truck rolls and little or no on-site intervention.

In one embodiment, switch 12 is a 26-slot services processing switch that marries scalable switching, routing and computing resources with an open software architecture to deliver computationally-intense IP services such as VPNs with scalable high performance. In one embodiment, switch 12 has a high-speed 22 Gbps redundant dual counter-rotating ring midplane. Slots are configured with four types of Service Blades: Control, Access, Trunk and Processor blades with specialized processing which enables a range of high-performance services including route forwarding, encryption and firewalls.

Service providers can use virtual routing capabilities of the switch 12, and its ability to turn IP services into discrete and customized objects, to segment and layer services for the first time for tens of thousands of discrete subscriber corporations. In addition, processor capacity can be added to switch 12 by adding new processor blades.

In one embodiment switch 12 includes an operating system which dynamically distributes services to switch 12 processors.

In one embodiment, the 26-slot services processing switch corrects for failures using the redundant counter-rotating ring midplane.

In one embodiment, each Service Blade automatically fails-over to a backup.

One embodiment of a switch 12 is described in U.S. patent application Ser. No. 09/661,637 entitled "System and Apparatus for Delivering Security Services," filed on an even date herewith and the description of which is hereby incorporated by reference for all purposes.

In one embodiment, switch 12 is designed to integrate seamlessly into a SP's preexisting network, whether that be through support of open routing protocols or through its Frame Relay to IPSec interworking solution that integrates new IP-based networks into a corporation's preexisting Frame Relay cloud.

The operating system will be described next.

In one embodiment, switch 12 includes a network operating system (NOS) 20. In one embodiment, network operating system 20 enables switch 12 to create discrete customized services to specific subscriber corporations by providing them each with a different configuration of service object groups. NOS 20 enables objects within these object groups to be distributed dynamically to customized processors so that application services are receiving the right level of computational support.

In one embodiment, NOS 20 is designed as an open Application Program Interface (API) that allows general-purpose software or new advanced IP services to be ported into the platform from best of breed third parties in a continual fashion, helping to enrich service providers' investment over time.

In one embodiment, NOS 20 includes a distributed messaging layer (DML) 22 component, an object manager (OM) component 24 layered over the DML, control blade redundancy (CBR) 26 for redundant system controllers, a resource manager (RM) 28 for managing separate resource elements and a resource location service (RLS) 30. Resource location service 30 provides load balancing across capable processor elements (PEs) to create an object. PE selection is based on predefined constraints.

In one embodiment, CBR 26 is layered over DML 22 and OM 24.

Figure 4:
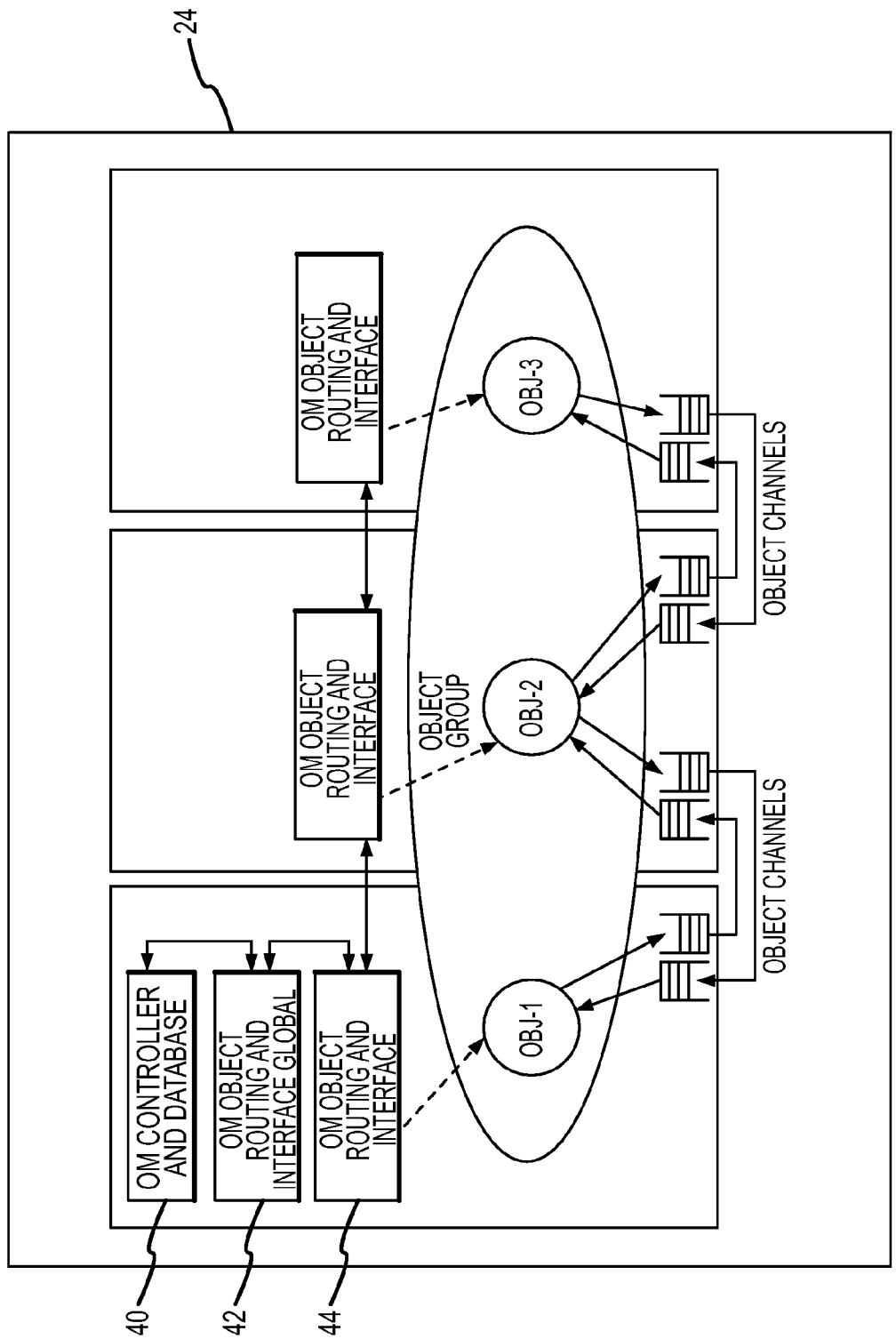
FIG. 4 is a block diagram illustrating the interactions among various object manager layers according to one embodiment of the present invention.

In one embodiment, Object Manager 24 consists of three layers as shown on FIG. 4. The upper layer titled OM Controller and Database (OMCD) 40 is concerned with managing the VPN and VR configuration. This is the agent that deals with the configuration manager directly. Middle layer 42 entitled OM Object Routing and Interface Global is concerned with managing global (across the switch system) object groups and object configurations. Lower layer 44 entitled OM Object Routing and Interface (OMORI) is concerned with managing local objects and groups as well as routing control information between address spaces based on the location of objects, and interfacing with the object via method invocation.

In one embodiment, the IPSX object database consists of two types of databases: Global (managed on Master Control Blade by OMORIG) and distributed local databases (managed by OMORI agents on every PE present in the system). In one such embodiment, the global database is a superset of the extracts from local databases.

Objects represent a basic unit of management for purposes of fault tolerance, computational load balancing, etc. One or more adjacent protocol modules can be placed into a single object. It is also possible that a module is split across two objects.

In IP, each host has a globally unique IP Address. Additionally each type of transport on top of IP has a globally unique Protocol ID. Each application on top of a transport has a Local Port Number that is unique locally. Thus an application instance in the network is uniquely identified by the tuple <IP Address, Protocol ID, Port Number>

In switch 12, each Processing Element (PE) has a globally unique PEID. Each type of object in a PE has a globally unique Type ID. Within each type, objects are assigned locally unique numbers or ID. Thus within a switch 12, each object is uniquely identified (analogous to IP applications) by <PEID, Object Type, Local Object ID>

The format of the Local Object ID is dependent on the object type. Mostly, driver and IO Layer objects have IDs that are constructed based on physical attributes. The physical attributes used are

| | |
|---|---|
| blade | A globally unique Blade ID (e.g. slot number). |
| port | A locally unique Port ID for all ports within a blade. |
| channel | A locally unique Channel ID for all channels within a port. (This may be dynamically variable as in Channellized DS3.) |
| vcid | A locally unique ID that is assigned by the Link Layer protocol agent, e.g., is a FR DLCI. |

The following function is used to initialize an Object ID for any object created by the Object Manager. (e.g. object id type is OBJ_ID_TYPE_OBJECT).

```
void obj_id_init (
    object_id_t          *id,
    object_type_t        type,
    object_group_id_t    group,
    local_object_id_t    object) ;
```

The following function is used to initialize an Object ID for any object created by the IO Layer. IO Layer objects are created either at system startup time by the device driver sub-system or by a Link Layer protocol module in response to an IOCTL. The important thing to note is that it is not created by Object Manager 24.

```
void obj_id_init_physical (
    object_id_t         *id,
    object_type_t       type,
    physical_id_t       blade,
    physical_id_t       port,
    physical_id_t       channel,
    physical_id_t       vcid) ;
```

Group is an aggregation point for all objects that comprises the VR. Group and VR have one-to-one mapping. A Group encompasses objects, which are located in different address spaces. Group Id, which identifies a group, is unique in the scope of a single switch 12.

Figure 5:
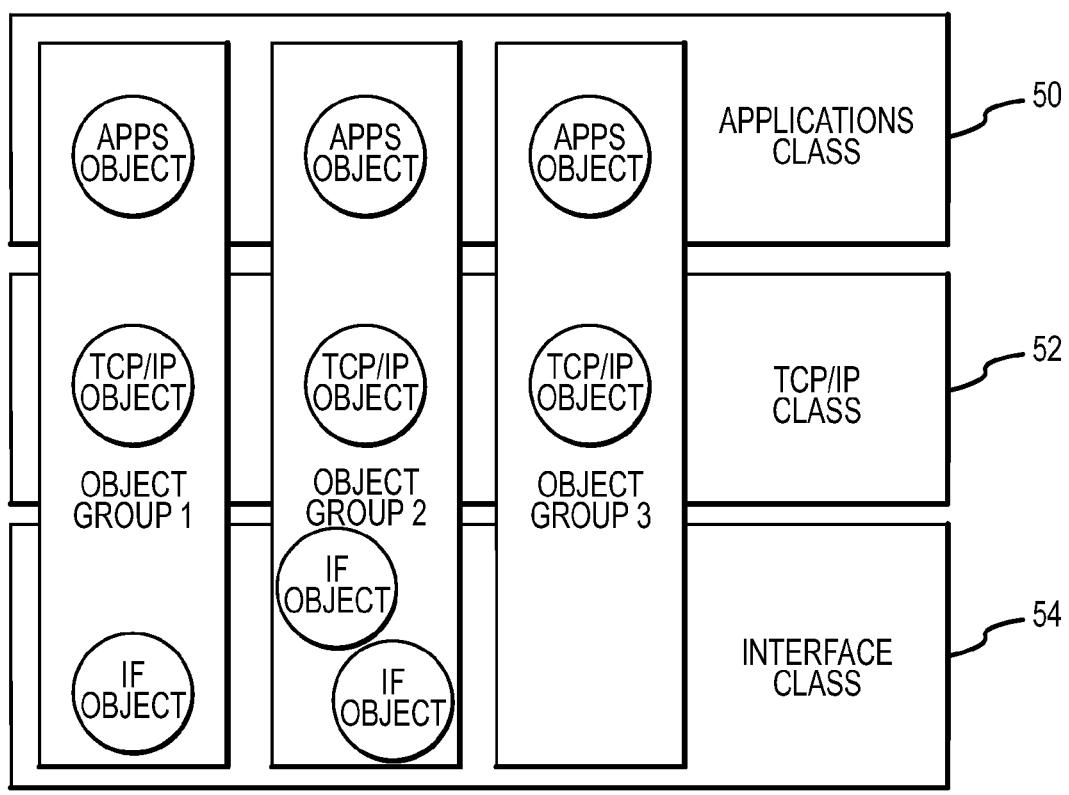
FIG. 5 is a block diagram illustrating the distinction between object classes and object groups according to one embodiment of the present invention.

FIG. 5 shows the distinction between an Object Class and an Object Group. Both are collections of objects. As shown in FIG. 5, an object class is a set of objects that have the same type signature and behavior (e.g. Applications Class 50, TCP/IP Class 52 and Interfaces Class 54). In contrast, for an object group, the constituent objects do not necessarily have the same type signature and behavior (e.g. Object Groups 1 to 3). There can be multiple objects of the same class in an object group (e.g. Object Group 2 has two objects of Interface Class). On the other hand, an object group need not have an object of each class (e.g. Object Group 3 does not have an object of Interface Class).

Figure 6:
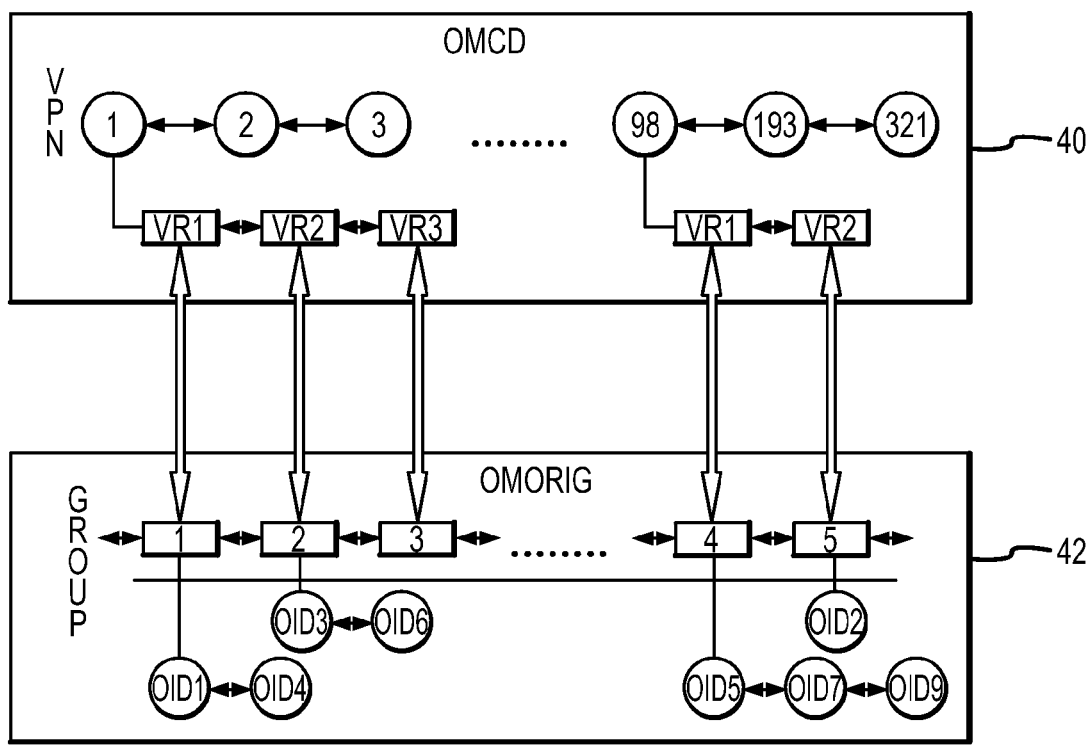
FIG. 6 conceptually illustrates Object Manager Controller and Database (OMCD) and Object Manager Object Routing and Interface Global (OMORIG) database maps according to one embodiment of the present invention.

In one embodiment, OMCD 40 is the agent, which interfaces to the Configuration Manager. As shown on FIG. 6 OMCD 40 manages 1) the Global list of VPN in system 10; and 2) the list of VRs per VPN. The caveats for VPN and VRs are:

VPN ID equal to 0 is illegal;

Global uniqueness of VPN ID across IPSX systems is the responsibility of the Service Management System (SMS).

In one embodiment, OMCD 40 creates a vpn descriptor every time Configuration managers request VPN creation. Every VPN is identified by a unique VPN ID. In one embodiment, each Virtual Router (VR) is identified by a VR ID, which is the IP Address of the VR. VR ID is unique in the VPN context. When Configuration Manager requests creation of an existing VR in the VPN, VR creation request is rejected. Otherwise a vr descriptor will be created.

There are several types of the VR:

1) ISP (Internet Service Provider) VR: Typically there is 1 such VR for a single switch 10.

2) Control VR: There can be only one Control VR for a single switch 10. This VR is used to host the management applications such as SNMP, Telnet etc.

3) Customer VR: There are several Customer VRs in a single switch 10. Typically, there is one Customer VR per customer service point.

Detailed VR creation process is described below.

An OMORIG agent 42 runs on every Control Blade, whether it is a Master or Standby Blade. Local OMORIs send changes to the Master. A Control Blade Redundancy (CBR) feature, described below takes care of replicating and synchronizing the OMORIG database from Maser to Standby.

Figure 7:
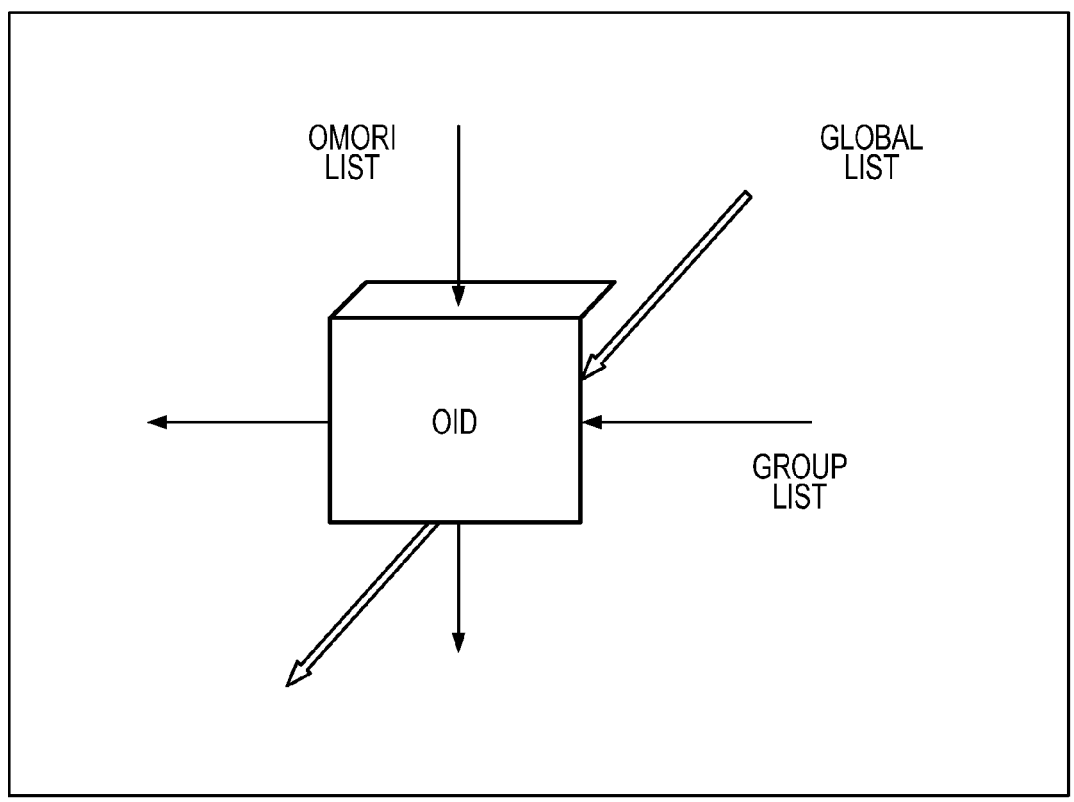
FIG. 7. conceptually illustrates an Object ID (OID) link in a global database according to one embodiment of the present invention.

OMORIG 42 provides several mappings of Object Ids. It manages lists of object Ids, which are located on the same address space, lists of object Ids which belong to the same group, a sorted Global object ID list and an unsorted Global object ID list. The OID link is shown on the FIG. 7.

OMORI is the OM agent. OMORI runs on every processing node and manages local objects and forwards IOCTLs to another object, whether local or remote. OMORI for each object creates object_descriptor_t, which has all the management information.

Figure 8:
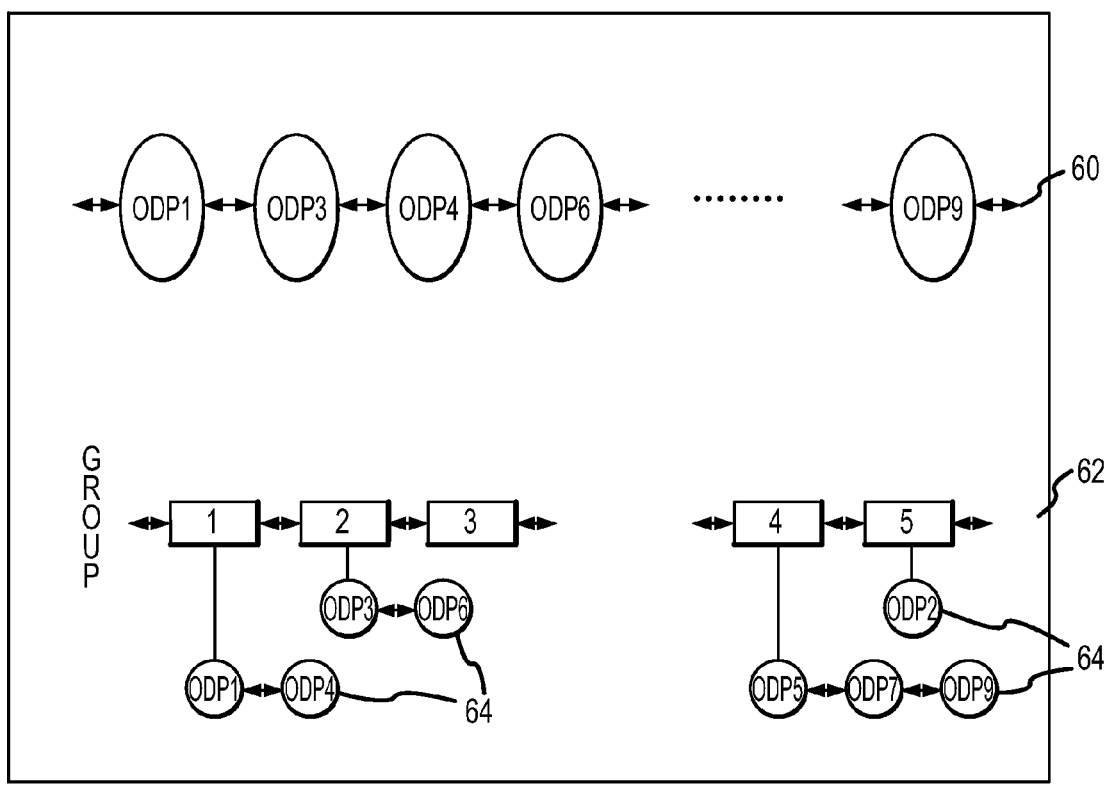
FIG. 8 is a block diagram conceptually illustrating an Object Management Object Routing and Interface (OMORI) database layout according to one embodiment of the present invention.

As shown on FIG. 8, OMORI manages a global list of local object descriptors 60, a global list of groups 62, and a list of object descriptors per group 64.

Each change in the OMORI database is propagated to the OMORIG, which runs on the Active Master. OMORI sends separate messages, varying by message tag, per each action to be taken to change Global Database.

OMORI additionally serves the request from the object on information about any other object. If requested object local to OMORI then it finds all the data in the local database otherwise OMORI agent forwards such a request to OMORIG, which has validated data.

The creation and deletion of objects in an object group needs to be coordinated. The issues to be dealt with are as follows. First, an object may need to IOCTL another object for correct setup or shutdown. We need to ensure that all default objects for the group are present.

Second, an object when using a cached pointer must be sure that it has not become stale.

Figure 9:
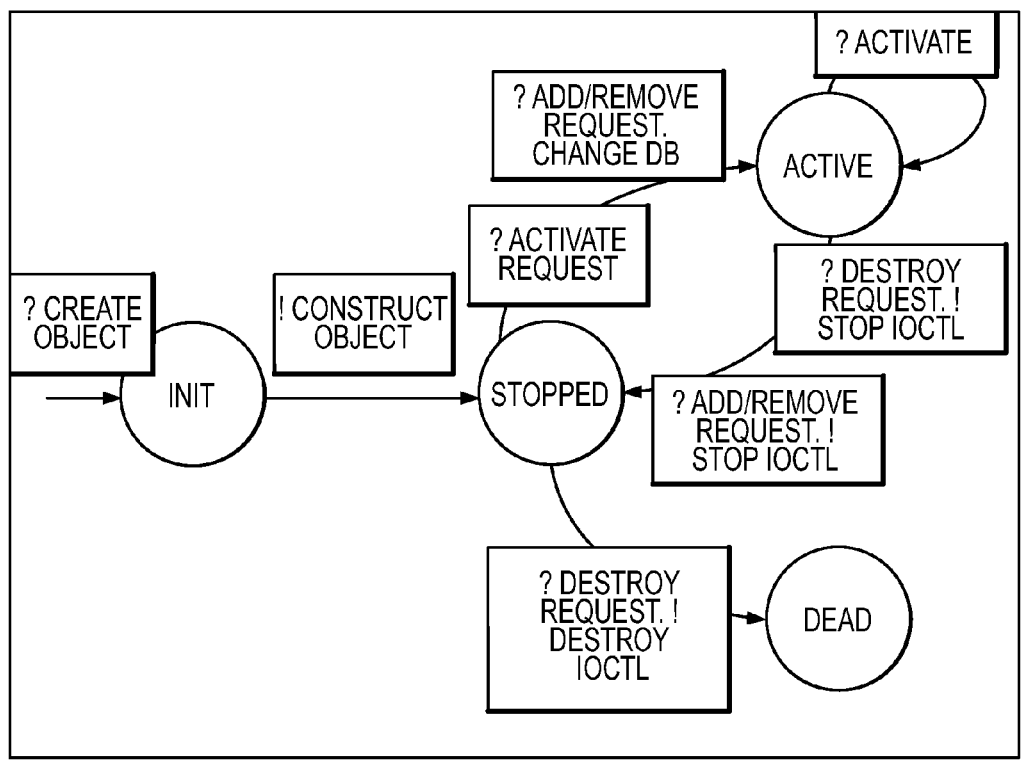
FIG. 9 is an object state transition diagram according to one embodiment of the present invention.

Every OMORI maintains a state machine for each local object. Each object is supposed to take an appropriate action on every state change notification from the OMORI. Object State Transition Diagram is in the FIG. 9 and detailed description is on the Table 1.

The caveats for the object states are as follows. First, in init state, the object's base data structure is created and initialized. Essential auxiliary data structures may also be created and initialized.

Second, in stopped state, no IOCTL or data send can take place. All non-essential auxiliary data structures must be deallocated. Only the object's base and essential data structures may remain allocated. All cached pointers should be released. All system resources (e.g. timers) must be deactivated. The object may be the target of IOCTLs and is expected to respond gracefully. The object should never initiate an IOCTL—either directly or in response to another IOCTL Third, in active state, non-essential auxiliary data structures and system resources are activated. The object may cache pointers. The object can initiate and respond to IOCTLs.

Fourth, in dead state, all (object's base and essential auxiliary) data structures are deallocated.

TABLE 1

Object State Machine

| STATE | EVENT | ACTION |
| --- | --- | --- |
| INIT | Receive Create Object Request | Cal constructor for the object class. Transit to STOPPED |
| STOPPED | RECV ACTIVATE request | Send ACTIVATE_OBJECT generic IOCTL, if completed with SUCCESS transit to ACTIVE. |
| STOPPED | RECV DESTROY request | Send DESTROY_OBJECT generic IOCTL, transit to DEAD, remove object descriptor from list, free it. |
| ACTIVE | RECV DESTROY request | Transit to STOPPED state. Send DESTROY_OBJECT generic IOCTL, transit to DEAD, remove object descriptor from list, free it. |
| ACTIVE | RECV ACTIVATE request | |
| STOPPED | RECV ADD to Group/ REMOVE from Group request | Modifies group membership as requested |

TABLE 1-continued

Object State Machine

| STATE | EVENT | ACTION |
|---|---|---|
| ACTIVE | RECV ADD to Group/ REMOVE from Group request | Transit to STOPPED state. Modifies group membership as requested |

Figure 10:
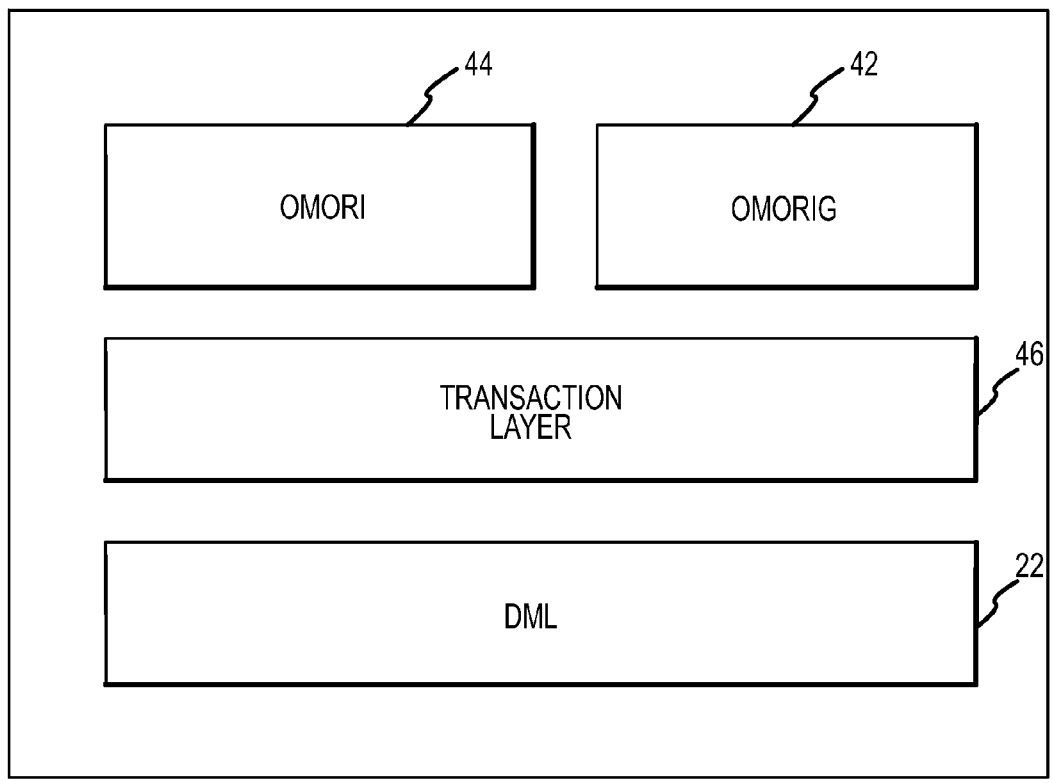
FIG. 10 is a block diagram illustrating various Object Management modules of an IPNOS according to one embodiment of the present invention.

Distributed Messaging Layer (DML) 22 is used to provide inter-processor communication and isolated channels for data and control messages as is shown in FIG. 10. OMORIG and OMORI communicate via predefined DML channel DML_CHAN_DATA. All IPNOS nodes in the system are members of DML_CHAN_DATA. During initialization process OMORI register to DML receive function, which will be called every time a new packet arrives on DML_CHAN_DATA. OMORIG and OMORI are DML applications and therefore they are notified on every dynamic event in the system.

There are four types of dynamic events indicated by DML. These are:
Peer Up—new IPNOS node detected and reachable.
Peer Down—existing IPNOS node became unreachable
Master Up—new Master elected in the system
Master Down—existing Master became unreachable On peer down event OMORI agent aborts all the pending transactions associated with the peer that went down. In addition, on a peer down event OMORIG destroys in its database all the objects that are local to the peer that went down. After that a scrub of the database is done. This includes destroying all groups which do not have any objects in them and destroying any VR associated with that group.

On peer up event and master up event OMORIG agent runs global database update protocol shown in FIG. 11. In addition, on peer up event OMORIG agent initiates a database update for local objects of the new peer. OMORIG maintains state machine per OMORI. Global Database Update State Transition Diagram is shown in FIG. 11. A detailed description of the transitions is in Table 2.

TABLE 2

Global Database Update Protocol

| STATE | EVENT | ACTION |
|---|---|---|
| START | TIMEOUT && (request count < MAX) | Send update request |
| START | TIMEOUT && (request count > MAX) | Peer did not reply. Update FAILED Transit to FINISH state. |
| START | RECV UPDATE GROUP message | Transit to UPDATE GROUP state. Set last update equal to the current time. |
| START | RECV UPDATE OBJECT message | Transit to UPDATE OBJECT state. Set last update equal to the current time. |
| UPDATE GROUP | RECV UPDATE GROUP message | Set last update equal to the current time. Modify Database |
| UPDATE GROUP | RECV UPDATE GROUP DONE message | Transit to UPDATE OBJECT state. Set last update equal to the current time. |
| UPDATE GROUP | TIMEOUT && (delay > MAX) | Transit to FINISH state. |
| UPDATE OBJECT | TIMEOUT && (delay > MAX) | Transit to FINISH state. |
| UPDATE OBJECT | RECV UPDATE OBJECT DONE message | Transit to FINISH state. |
| UPDATE OBJECT | RECV UPDATE OBJECT message | Set last update equal to the current time. Modify Database |

The same protocol is initiated on a master up event by the OMORIG agent to all peers that are known at that moment.

As described above, when peer goes down all virtual routers (VRs) as well as groups and objects, associated with that peer, are removed from the Global Database. If for some reason switch 12 becomes partitioned and then coalesces back, the problem with dangling objects arises, because all the objects still exists on the isolated peer. To address this a database reconciliation process is provided.

On a peer up event, the global database update protocol is started. When an update group message is received and the group is not found in the group list then 1) Look up VR by VPN ID and VR ID from the update message. If not found, then need to recreate dependencies by the following algorithm:
   Check whether VPN with VPN ID, from the update message, exists. If not then create VPN with the specified VPN ID.
   Check whether VR with VR ID, from the update message, exists. If not then create VR with the specified VR ID.
   Create group with ID received from the update message.

2) VPN/VR found: Send message to the OMORI, which send an update message to remove, specified group.

Transaction Layer 46 in FIG. 10 is used to provide management of request/reply transaction and has exactly once semantics, with guaranteed termination. There is a global list of requests on each processor. Each request is identified by unique index. When request is being sent a callback function could be provided if reply is expected.

Object creation and communication will be described next.

Figure 12:
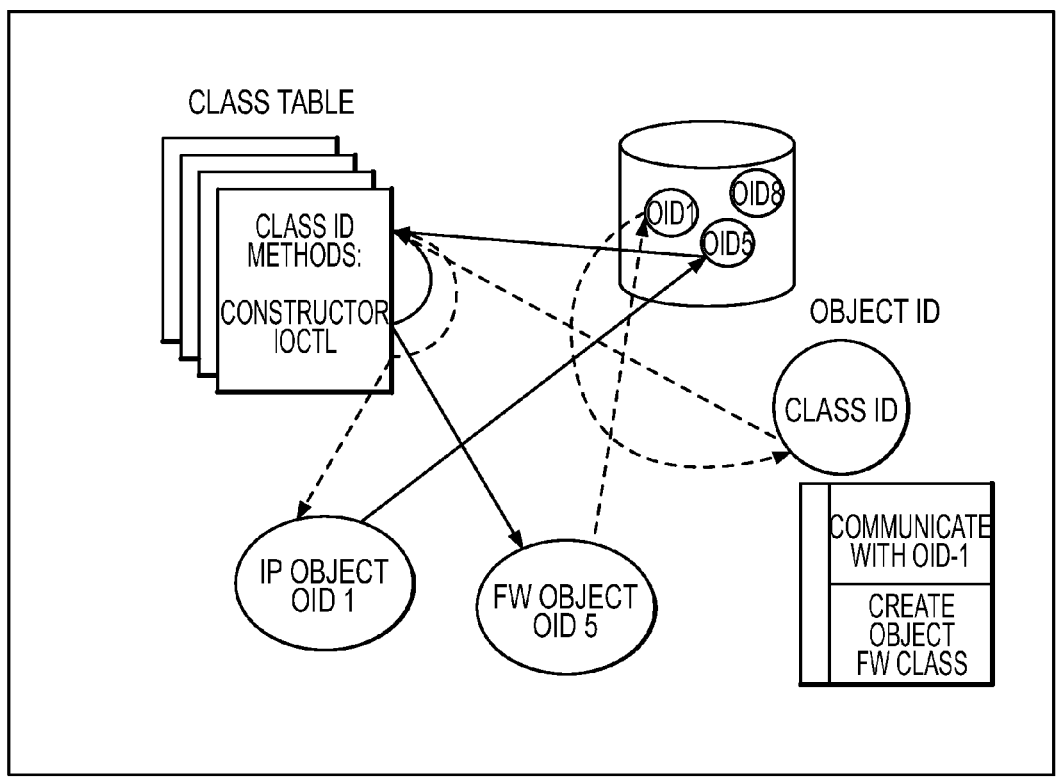
FIG. 12 conceptually illustrates the communication for object creation according to one embodiment of the present invention.

In FIG. 12, the communication for object creation is shown. IP object with OID 1 requests Firewall object to be created. OM creates object descriptor and based on the specified class of the object (e.g. Firewall), OM finds the appropriate constructor function in the object class table and constructs the new object. The same algorithm is used for management communications between objects (IOCTL). Based on the class id of the destination object appropriate control function from the object class table is called. It is the responsibility of the object implementers is to supply handlers for all supported IOCTLs.

The IOCTL mechanism is described below. Typically IOCTL between objects is used for Management Plane communications. For Data Plane communications between objects, object to object channels are used.

Objects can be created in three different ways:
REGISTERED: Created as system comes up (e.g. drivers) and registered to the OMORI with object id, having physical location meaning.
CREATED BY OM: Created by Object Manager. In this case OMORI creates a locally unique (in the scope of this address space) object ID that in conjunction with address space id gives unique object id inside of the system. To create an object, the constructor function based on the object class will be called.
ASSIGNED and REGISTERED: This is hybrid of two cases described above. Object created without OM, but requests OM to assign unique Object ID to it and registers with this ID to OMORI. Typically this is used by the Resource Manager.

OM 24 issues control codes when invoking the control method for an object. To ease the management of these control codes, a module based code scheme is used.

Every code is composed of an implicit module identifier and a module specific code identifier. The macro OBJ_CTL_CODE(module, module_specific_code) is used to construct the object control code.
    #define OBJ_CTL_CODE(m,c) (((m)<<24) (c))
    #define OBJ_CTL_MODULE(c) ((c)>>24)

Generic IOCTL are primarily, used by Object Manager 24, to inform all the objects in the specified group of some state change. For example, when user requests to delete VR, before removing all the objects in the VR's group, STOP_OBJECT generic IOCTL is sent to every object in the group. MODULE_ALL is used as a module identifier for all the generic IOCTLs.

Every object should support the following generic IOCTLs:
    ACTIVATE_OBJECT
    STOP_OBJECT
    DESTROY_OBJECT OM 24 does not interpret the code component. The object shell breaks the control code in to a module identifier and a module specific code. It then issues the module specific code to a module specific control function.

Objects can be destroyed in two different ways:
    DEREGISTERED: Objects which were registered on creation will be deregistered on destruction
    DESTROYED: There is no explicit destructor to destroy an object, instead generic IOCTL DESTROY_OBJECT is send to object, which is to be destroyed.

The IOCTL mechanism provides a reliable transaction oriented inter-object communication that is suitable for management and control traffic. However, the IOCTL based communication is not fast or efficient. For protocol data traffic, a lighter, faster and efficient mechanism is needed.

In one embodiment, object channels provide a Point-to-point (P-P) communication mechanism that is based on a send-and-forget model of programming. Packets arriving at an object channel are delivered to the object asynchronously.

Objects maintain a list of Connection End Points (CEP). Each CEP is assigned an index that is unique within the scope of the object. Since the object's OID is globally unique, a globally unique CEP-ID is generated by the tuple
    <OID, Type, index>

The type parameter is used to distinguish between different classes of CEPs. (E.g. the IP Forwarding object has CEPs for Virtual Interfaces and CEPs to cryptographic resources.) The CEP is represented in IPNOS by the obj_comm_t data structure.

Each object allocates a CEP (which is typically embedded within an object specific structure). The object then initializes the CEP by the function

```
extern  int     obj_init_channel (
        obj_comm_t          *channel,    /* Channel to init */
        void                *object,     /* Object channel is
                                           associated with */
        obj_comm_service_f  *service     /* Rx Packet service
                                           handler */
        );
```

The service parameter for obj_init_channel is an upcall handler function that is called when a packet is received on the channel. The object parameter is passed as the first parameter of the upcall handler, and is typically used to identify the data structure that the channel is embedded in.

After a CEP has been initialized, it can be connected to another CEP via

```
int  obj_associate_channel (
     obj_comm_t     *local_chan,   /* Local channel */
     obj_cep_id_t   *local_cep,    /* Local channel ID */
     obj_cep_id_t   *remote_cep    /* Remote channel ID */
     );
```

A CEP that is connected can be disconnected via

```
int obj_disassociate_channel (
    obj_comm_t     *local_chan    /* Local channel */
    );
```

Sometimes it is necessary that a CEP be loopbacked to itself. This can be done by

```
int  obj_loopback_channel (
     obj_comm_t    *local_chan,   /* Local channel */
     obj_cep_id_t  *local_cep     /* Local channel ID */
     );
```

Figure 13:
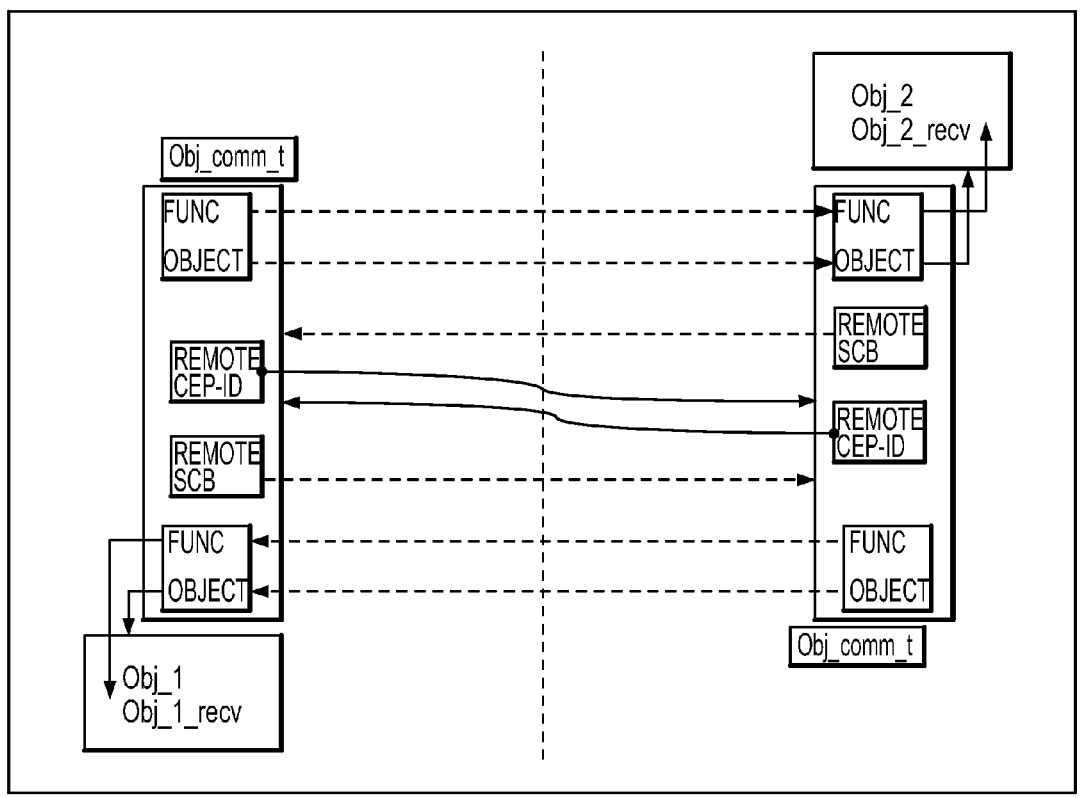
FIG. 13 conceptually illustrates how object channels provide a Point-to-Point (P-P) communication mechanism between objects via Connection End Points (CEPs) in the same address space according to one embodiment of the present invention.

FIG. 13 shows the linkages when two CEPs within the same address space are connected. Note that
1. The CEP has a send and a receive section (of type obj_comm_params_t).
2. The send section of Obj-1 is updated with the contents of the receive section of Obj-2.
3. The send section of Obj-2 is updated with the contents of the receive section of Obj-1.
4. The Remote CEP-ID of each object (of type obj_cep_id_t) contains the CEP-ID of the CEP at the other end.
5. The field remote_srv_cb points to the remote CEP. (This is not used when the CEPs are in different address spaces.

When Obj-1 sends a packet to Obj-2, it becomes a function call. The overhead is very little. The sequence of actions that takes place when obj_associate_channel is called is shown in Table 3.

TABLE 3

Connecting local CEPs

| Step | Local CEP Object | IPNOS | Remote CEP Object |
|------|------------------|-------|-------------------|
| 1 | obj_associate_channel (local_chan, local_cep_id, remote_cep_id) | | |
| 2 | | omori_obj_ioctl_by_id (&remote->object, remote_cep_id->object.group, OBJ_CTL_CODE (remote_cep_id->module_id, GET_CEP_ADDR), &cep, sizeof (get_cep_addr_t) Remote_chan = cep.address | |
| 3 | | | In GET_CEP_ADDR IOCTL handler, return CEP's address. |

TABLE 3-continued

Connecting local CEPs

| Step | Local CEP Object | IPNOS | Remote CEP Object |
|------|------------------|-------|-------------------|
| 4 | | Copy CEP IDs to remote and local | |
| 5 | | Setup local channel pointers | |
| 6 | | Setup remote channel pointers | |

Figure 14:
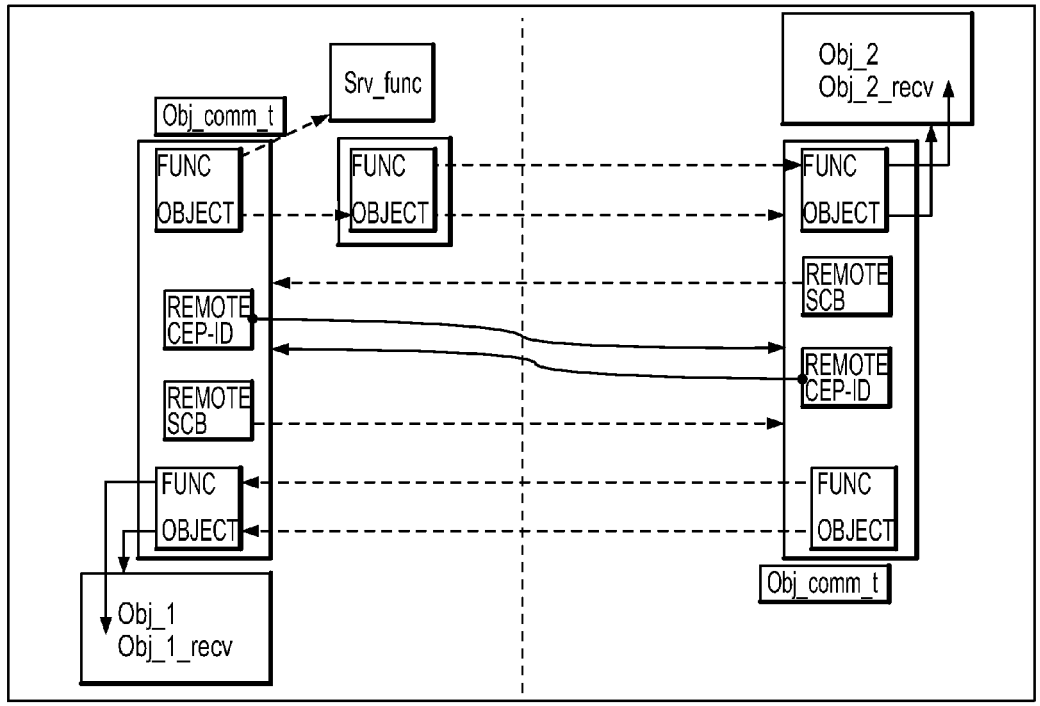
FIGS. 14 and 15 conceptually illustrates how services can be pushed onto an object channel that has been established between a first object and a second object according to one embodiment of the present invention.
Figure 15:
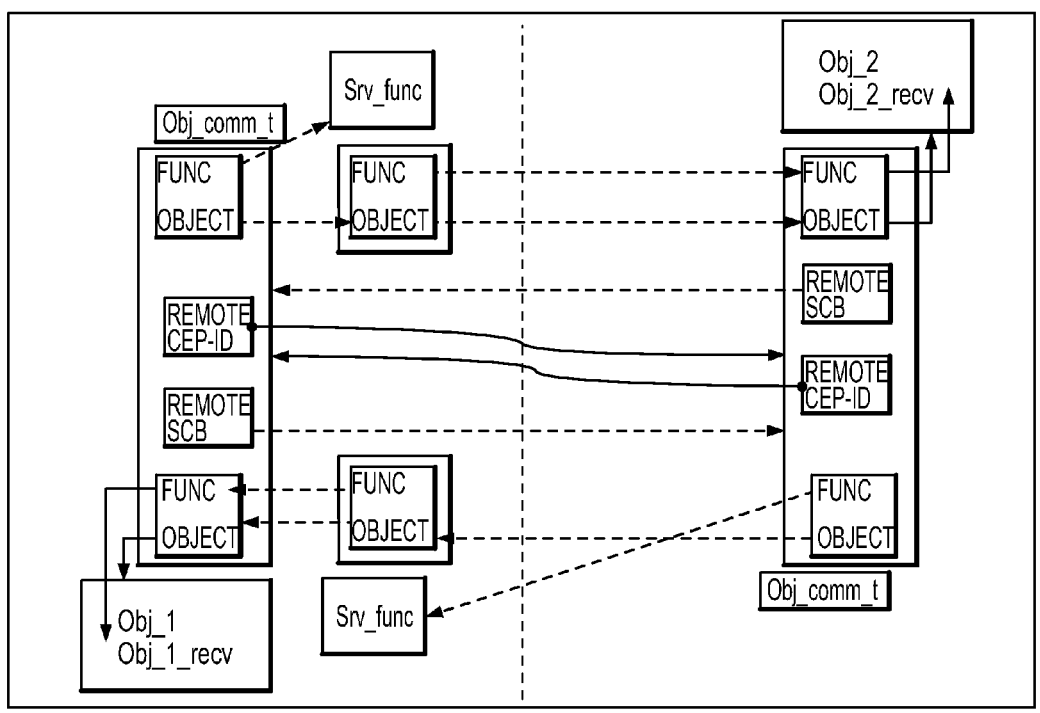

FIGS. 14 and 15 show how services can be pushed onto a channel that has been established. (Note that the services and parameters should be pushed after a connection has been established. Services and service parameters from an earlier connection can not be assumed to be in effect.)

To enable a service, use the function

```
int    obj_update_service_params_on_channel (
       obj_comm_t                *channel
       int                       service_id,
       int                       direction,
       int                       operation,
       void                      *params
       );
```

To disable a service, use the function

```
int    obj_disable_service_on_channel (
       obj_comm_t                *channel
       int                       service_id,
       int                       direction
       );
```

To update the parameters for a service, use the function

```
int    obj_update_service_params_on_channel (
       obj_comm_t                *channel,
       int                       service_id,
       int                       direction,
       int                       operation,
       void                      *params
       );
```

Note that in FIG. 14, only the local CEP is modified when a service is enabled on transmit. In FIG. 15 on the other hand, the remote CEP is modified when a service is enabled on receive.

The services that are currently supported are:

| | |
|---|---|
| OBJ_COMM_SRV_NONE | This is never used. It is used to indicate the CEP base. |
| OBJ_COMM_SRV_UNSPECIFIED | This is never used. May be used to indicate errors. |
| OBJ_COMM_SRV_REMOTE | This service provides transport between PEs (aka address spaces). This service is automatically pushed, by IPNOS, on both receive and transmit at both ends of the channel, when the CEPs are in different PEs. |
| OBJ_COMM_SRV_LOCALQ | In a VI—VI connection, this is used to breakup the function call chain. It is used only when the VI CEPs are both in a single PE. |
| OBJ_COMM_SRV_RAQ | This is used to enforce a specific rate. The integration interval used is that of a single OS Clock Tick. It is currently not used. In the future a better algorithm based on the Leaky Bucket should be used. |

Connecting CEPs in different address spaces (aka PEs) is more complex. IPNOS uses channel services to bridge the address spaces. The specific service that is used is OBJ_COMM_SRV_REMOTE. The steps taken by NOS 20 are shown in FIG. 16.

Figure 17:
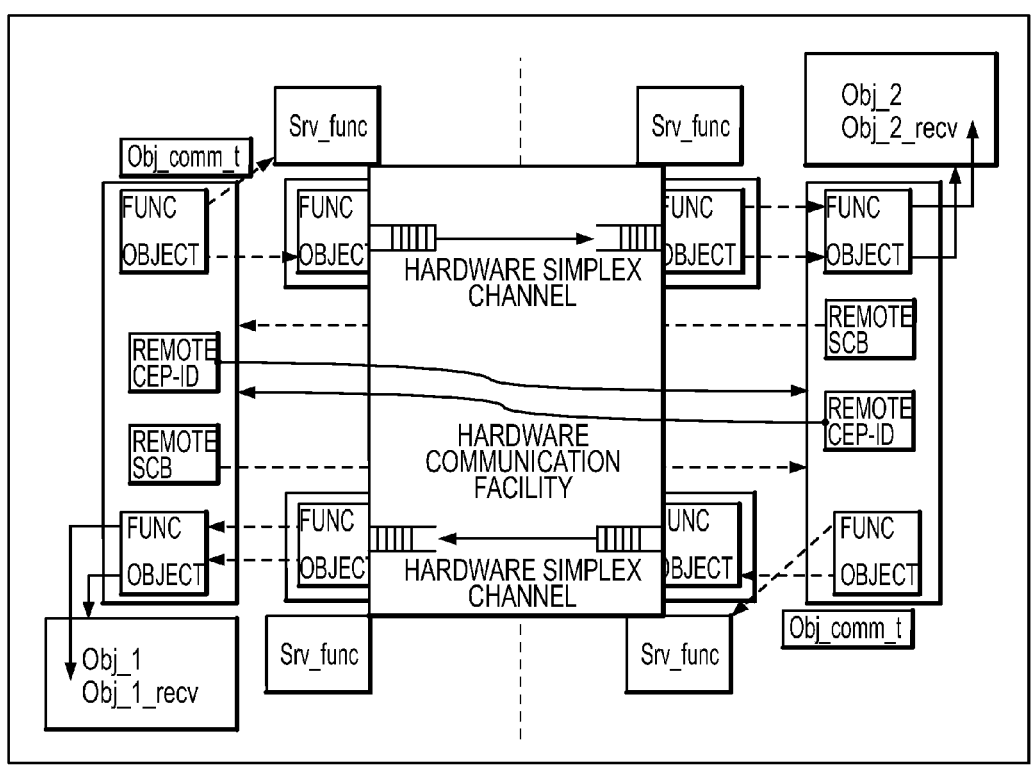
FIG. 17 conceptually illustrates how object channels are established between CEPs in different address spaces via a remote channel service according to one embodiment of the present invention.

Connecting remote CEPs involves the two objects, NOS 20 on both PEs, Resource Manager and Logical Queue Manager on both PEs. FIG. 17 shows the configuration when remote CEPs are connected.

A method of using OM 24 will be described next in the context of VR creation. To explain VR creation process a simplified version of a single object in the group is used.

Figure 18:
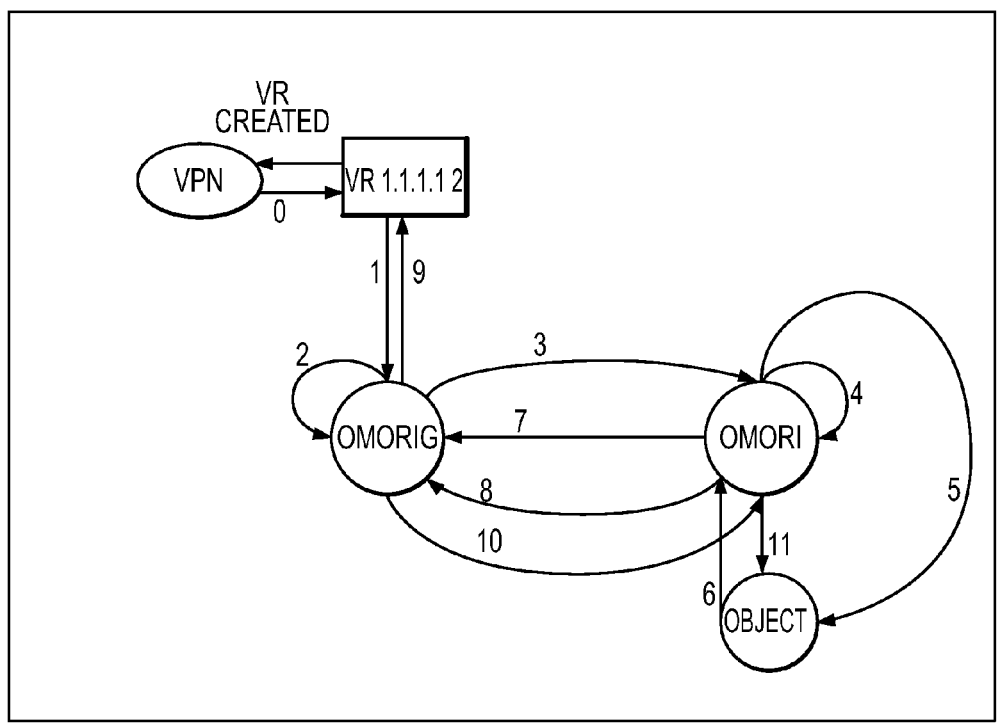
FIG. 18 conceptually illustrates virtual router (VR) creation with a single object according to one embodiment of the present invention.

As shown on the FIG. 18, user requests creation of VR 1.1.1.1 for VPN 1 on the blade with id 2. (This implies that VPN 1 was created prior to the described request.) In one embodiment, the steps described in FIGS. 19A, 19B and 19C will be taken.

Figures 19C, 20:
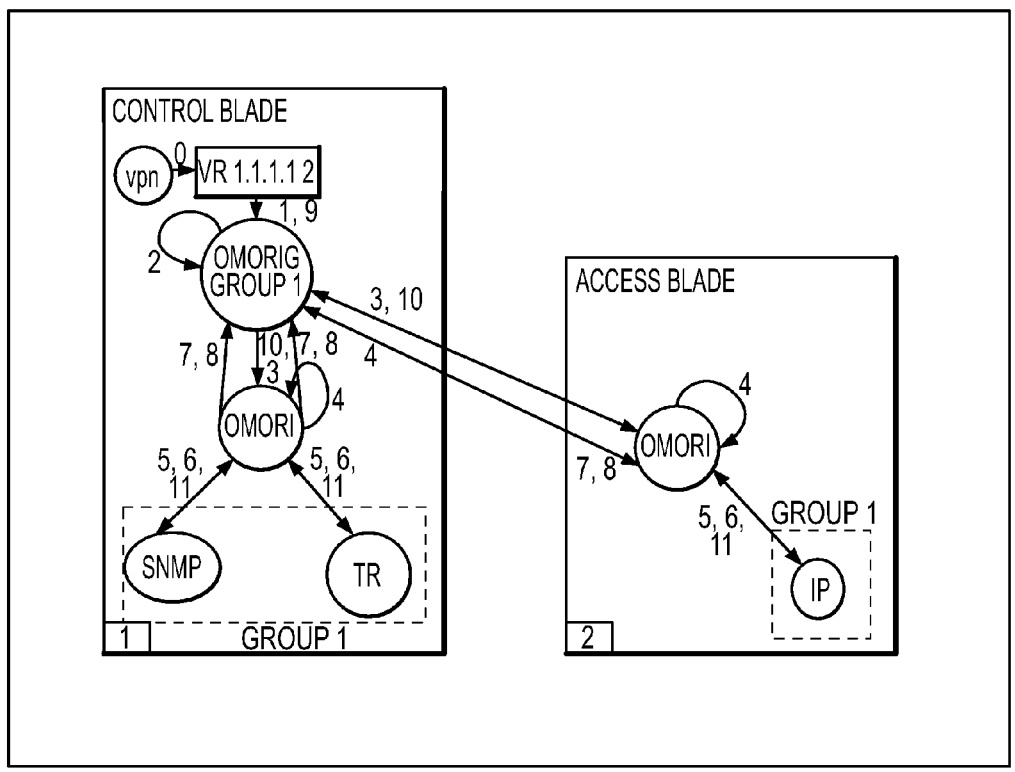
FIG. 20 conceptually illustrates VR creation with multiple objects according to one embodiment of the present invention.

As shown on FIG. 20, user requests to create VR 1.1.1.1 for VPN 1 on blade with id 2. This implies that VPN 1 was created prior to the described request. VR consists of multiple objects. As an example here IP object, trace route object (TR), and SNMP object encompass VR. In one embodiment, the steps described in FIGS. 21A and 21B will be taken.

A complement operation to create VR with multiple objects in the group is to destroy such a VR. Destroy VR operation is shown on the FIG. 22. In one embodiment, the sequence of steps taken is shown in FIG. 23.

Scalability issues will be discussed next. An IOCTL to the object, which is located on the processor other than originator of the IOCTL, causes IOCTL to be forwarded to the OMORIG agent. OMORIG looks up the object id in the Global Database and then routes this IOCTL to OMORI agent where found object lives. When IOCTL completed, an IOCTL reply is sent again to the OMORIG, which forwards this reply to originator of the IOCTL request. As seen from the above description with increasing number of the IOCTL requests, OMORIG agent becomes a bottleneck.

In one embodiment, to eliminate unnecessary traffic, an OMORI cache is designed. By this design OMORI maintains cache table of the objects IDs. When IOCTL is to be forwarded OMORI agent checks cache table. If object ID not found then IOCTL is forwarded to the OMORIG as in original scheme. When IOCTL reply is received object ID is inserted in the cache table. If object ID found the IOCTL is forwarded directly to OMORI, identified by the address space id saved in the object ID. Cache table is invalidated periodically.

In one embodiment, OMORI cache table is designed to use a closed hashing algorithm (also known as open addressing). In a closed hashing system, if collision occurs, alternate cells are tried until the empty cell is found. In one embodiment, closed hashing with linear probing is used. In one such embodiment, limited search is added such that, in case of collision only a limited number of cells will be tried. If empty cell is not found, then a new entry will replace the collided one.

In one embodiment, all elements in the OMORIG as well as in the OMORI database are managed using double linked circular list. As the number of elements in the list increases rises, however, the problem of search latency becomes an issue. In one embodiment, therefore, lists (which supposedly have large number of elements) are modified to the hash table. Open hashing is used for this purpose. Open hashing is to keep a list of all elements that hash to the same value.

One embodiment of a Control Blade Redundancy algorithm will be discussed. As noted above, in one embodiment, system 10 is designed to provide Fault Tolerance. In one such embodiment, each Control Blade runs management modules such as Command Line Interface (CLI) and Simple Network Management Protocol (SNMP), which allows configuration of system 10. Each of these modules retrieves data from the OM Global Database that resides on the Control Blade. Global database is constructed from the distributed OM Local Databases, which are stored on every processing node in the system.

In one embodiment, each switch 12 has at least two Control Blades. In the event of Control Blade failure, system management and configuration are done using the backup Control Blade. Thus NOS 20 provides a Control Blade Redundancy (CBR) service. This document discusses the protocol used to provide a synchronized backup of the OM Global Database as part of the CBR service.

In the following description,

Master—Processing Engine 0 (PE 0) on the Control Blade (CB) which is being use to manage and configure the system and participates in the message passing communication.

Slave—Processing Engine 1-3 (PE 1-3) on the CB and PE0-4 on Access or Processor Blades which participates in the message passing communication.

Standby—Processing Engine 0 (PE 0) on the Control Blade (CB) which can be used to manage and configure the system in the case of Master failure and participates in the message passing communication.

Figure 24:
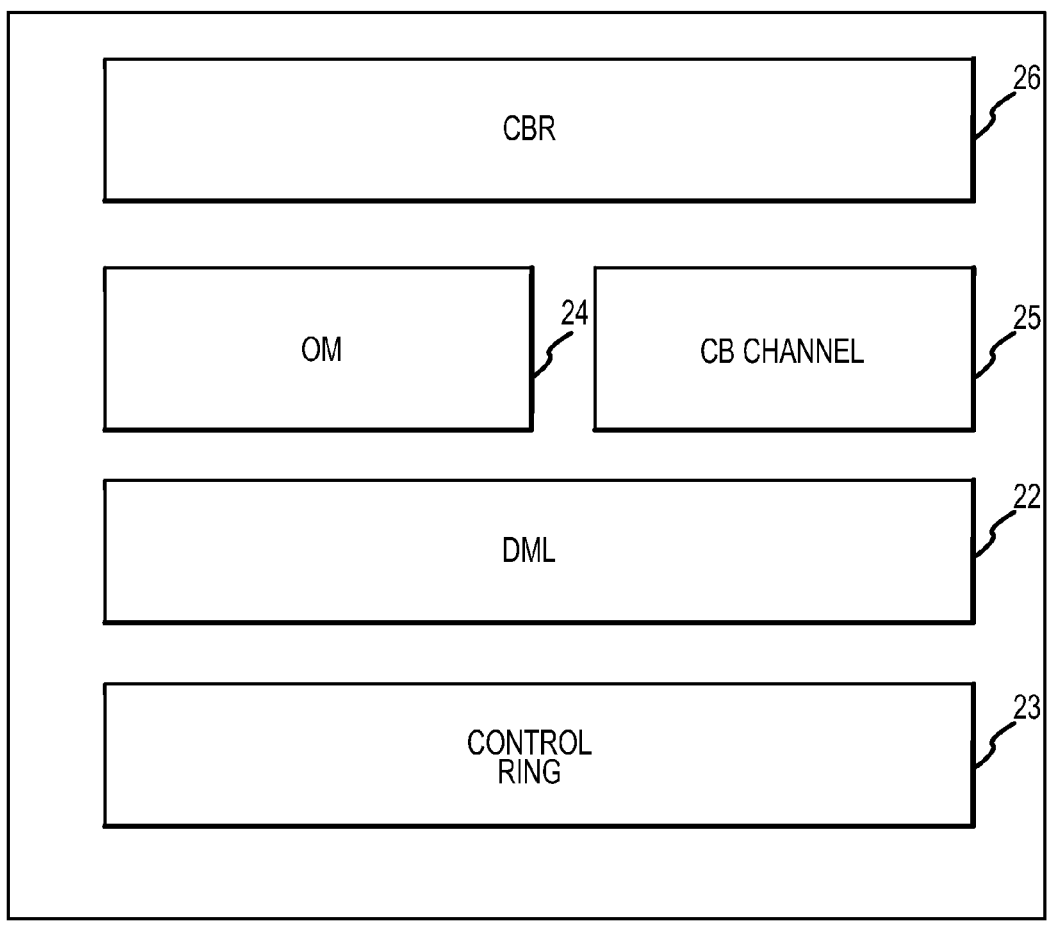
FIG. 24 illustrates various IPNOS layers that are relevant to creating and maintaining replicas of the master control blade management information on one or more standby control blades according to one embodiment of the present invention.

Peer—any Processing Engine which participates in the message passing communication As noted above, NOS 20 consists of the several layers. FIG. 24 shows only layers, which are relevant to the Database Redundancy problem that is discussed in this document.

Control Ring Driver 23—notifies upper layer on the following events:

blade up: new blade inserted in the system and became operational blade down: blade removed from the system and became non-operational;

master blade up: new CB inserted and Control Ring decided that this is a Master standby blade up: new CB inserted and Control Ring decided that this is a Standby slave blade up: new blade inserted and this is not CB.

Distributed Messaging Layer (DML) 22 is message passing model to provide inter connectivity between processing nodes and channel management. DML 22 provides a reliable group communication based on message passing infrastructure by implementing:

reliable sequenced layer supports of channels that provide independent communication universes Group operation on the channel like send, recv barrier synchronization and broadcast.

Dynamic group membership that reflects dynamic state of the system.

Object Manager (OM) 24 is a module, which manages VPN, VR, objects and object groups in the system. Provides an IOCTL like mechanism for reliable fault tolerant messaging between objects that is typically used for management function. This uses the DML channel "DML_CHAN_WORLD". This mechanism was described above.

CB Channel 25 is a DML channel whose members are the dynamic set of Control Blades present and intercommunicating in the system.

Control Blade Redundancy (CBR) 26 is a module, which provides redundant Global Database on the Standby blades; CBR 26 is a DML application that receives notification from DML on all UP/DOWN events.

Figure 25:
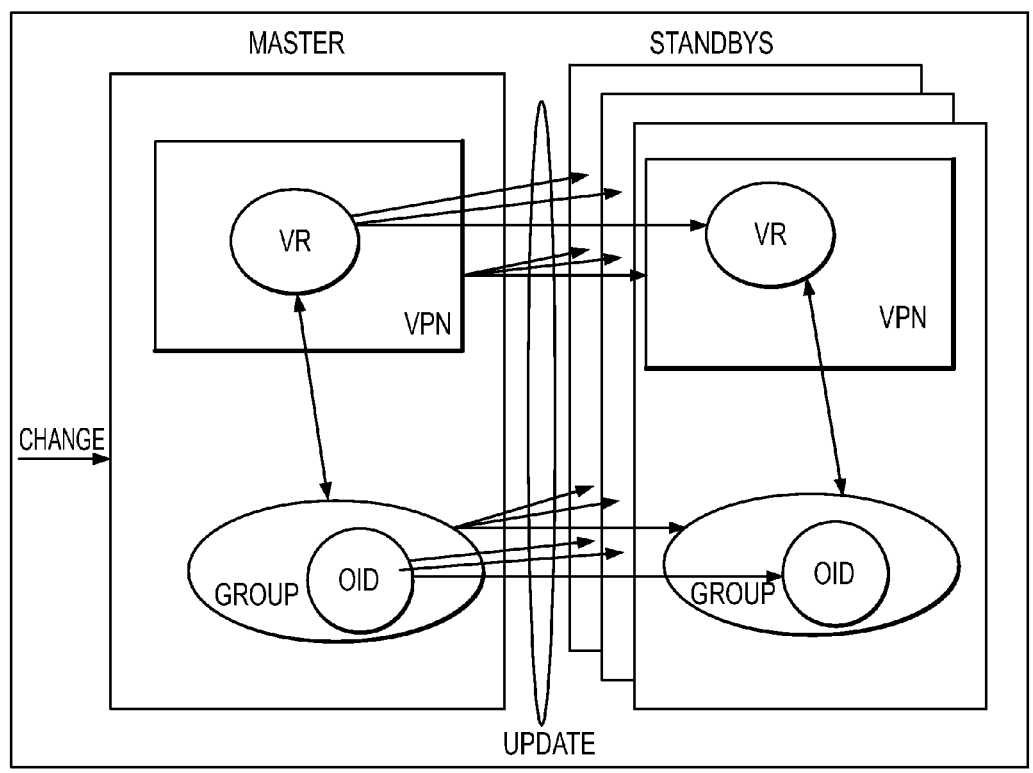
FIG. 25 conceptually illustrates control blade redundancy according to one embodiment of the present invention.

In one embodiment, Control Blade redundancy (CBR) 26 is designed to create and maintain replicas of the Master Control Blade management information on the Standby Control Blades and to reuse that information in the case of failure of the current Master and election of a new Master. Control Ring Driver 23 normally elects the new Master. If the Control Ring detection mechanism fails, however, a software-based leader election protocol implemented by DML 22 will elect the new Master. This redundancy is illustrated in FIG. 25.

An important part of the management information is the OM Global Database. A key issue of the CBR is the consistency of OM Global Database. The OM Global Database is synchronized in two ways: bulk updates and flash updates. Bulk updates are used in CBR 26 on dynamic events like peer up/down. Flash updates are used to propagate individual change in the database (like a VR being created or deleted).

There are four Data Types which CBR protocol supports: Virtual Private Network (VPN), Virtual Router (VR), GROUP (an internal representation of the VR; set of all objects belonging to VR), and Object ID (OID).

CBR protocol provides sequential messaging per Data Type. If Standby receives update message with sequence number, which is not equal to the one expected then Standby sends message about it to Master and Master restarts update from the beginning. Note that DML provides a sequenced reliable transport and this should not happen normally. It could happen if the underlying SRTP Point-to-Point link resets as a result of timeout.

As a DML application CBR 26 is notified of events happening in the system. The events indicated are peer up, peer down, master up, master down.

On peer down event CBR does not need to take any action, OM on every Control Blade will update its database.

On master up/master down event CBR also does not need to take any action, because master up event always comes with peer up/peer down event where all the actions were taken.

On peer up event Master will dump its own Global Database to the all Standby Nodes. The dump algorithm is described in the Transition Diagram.

Figure 26:
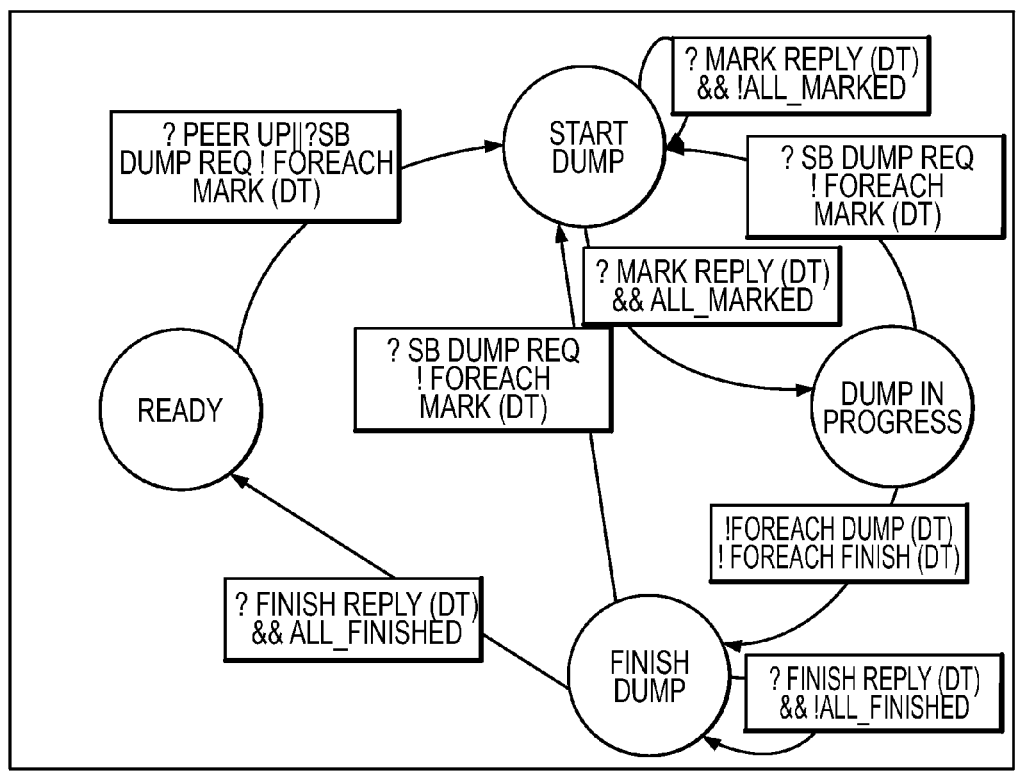
FIG. 26 illustrates a control blade redundancy (CBR) state transition diagram for a master control blade according to one embodiment of the present invention.

FIG. 26 shows Master's State Transition Diagram. Master maintains state of each node participating in the CBR protocol. Master itself does not transition from the READY State. When peer up event occurs for a standby a new CBR node is added to the list and state is initialized to READY. In FIG. 26, DT denotes Data Types (described above). ALL_MARKED is a bitmap that is used to keep track of the MARK replies for the specific Data Type. When all replies arrived bitmap is equal to bitmask, which means that all Data Types were marked.

ALL_FINISHED is a bitmap that is used to keep track of the FINISH replies for the specific Data Type. When all replies arrived bitmap is equal to bitmask, which means that all Data Types were finished DUMP Master State Transition Table is given on the Table 4.

TABLE 4

DUMP Master State Transition Table.

| STATE | EVENT | ACTION |
|---|---|---|
| READY | PEER UP | Send MARK request for each Data Type<br>Transit to START DUMP |
| READY | RECV DUMP request from Standby (invalid message sequence number) | Send MARK request for each Data Type, clear ALL_MARKED<br>Transit to START DUMPs |
| vSTART DUMP | RECV MARK reply for one of the Data Types &&! ALL Data Types MARKED | Modify ALL_MARKED to include replied peer |
| START DUMP | RECV MARK reply for one of the Data Types && ALL Data Types MARKED | Transit to DUMP_IN_PROGRESS State.<br>For each Data Type send DUMP DATA;<br>For each Data Type send FINISH DATA;<br>Transit to FINISH_DUMP; |
| START DUMP | RECV DUMP request from Standby (invalid message sequence number) | Send MARK request for each Data Type, clear ALL_MARKED |
| DUMP_IN_PROGRESS | RECV DUMP request from Standby (invalid message sequence number) | Send MARK request for each Data Type<br>Transit to START DUMP |
| FINISH DUMP | RECV FINISH reply for one of the Data Types &&! ALL Data Types FINISHED | Modify ALL_FINISHED to include replied peer |
| FINISH DUMP | RECV FINISH reply for one of the Data Types && ALL Data Types FINISHED | Transit to READY |
| FINISH DUMP | RECV DUMP request from Standby (invalid message sequence number) | Send MARK request for each Data Type<br>Transit to START DUMP |

Figure 27:
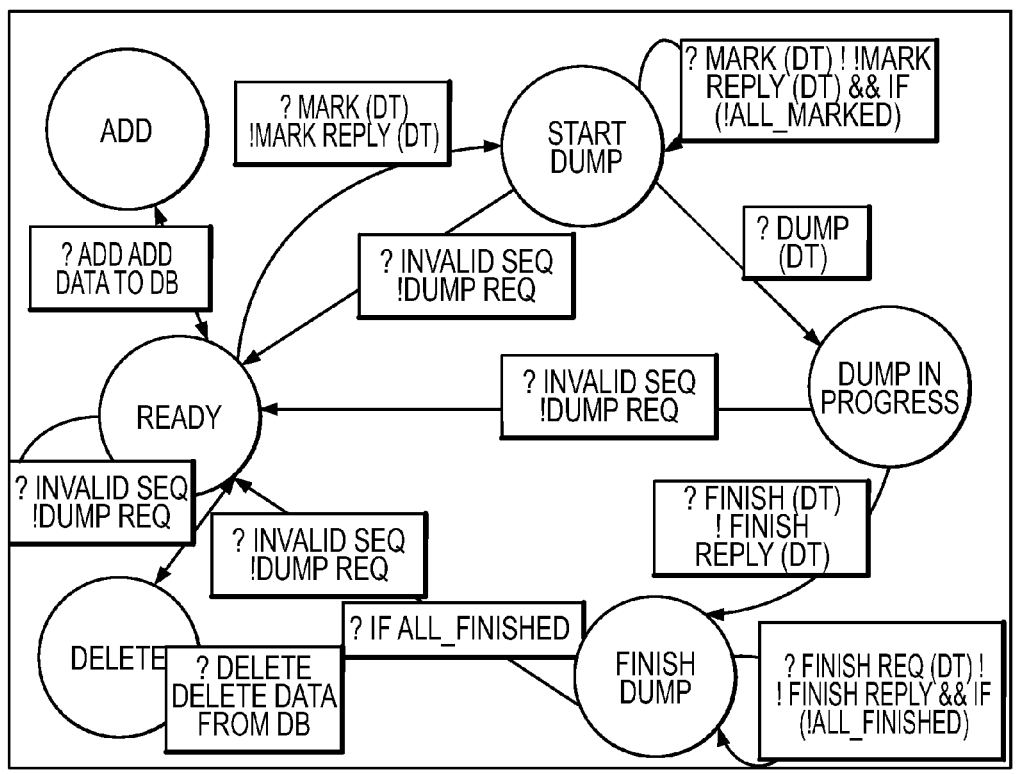
FIG. 27 illustrates a CBR state transition diagram for a standby control blade according to one embodiment of the present invention.

Standby Node maintains the state transitions shown on FIG. 27 and in Table 5 only for itself. When CBR 26 is initialized state is READY

TABLE 5

Dump Standby State Transition Table

| STATE | EVENT | ACTION |
|---|---|---|
| READY | RECV MARK request for one of the Data Types | Send MARK reply for this Data Type<br>Transits to START DUMP |
| READY | RECV invalid message sequence number for flash updates | Send DUMP request to Master |
| READY | RECV ADD request for one of the Data Types and invalid message sequence number | Send DUMP request to Master |
| READY | RECV ADD request for one of the Data Types | Add data to the Database |
| READY | RECV DELETE request for one of the Data Types and invalid message sequence number | Send DUMP request to Master |
| READY | RECV DELETE request for one of the Data Types | Delete data from the Database |

TABLE 5-continued

Dump Standby State Transition Table

| STATE | EVENT | ACTION |
|---|---|---|
| START DUMP | RECV MARK request for one of the Data Types && ALL Data Types MARKED | Transit to DUMP_IN_PROGRESS State.<br>For each Data Type send DUMP DATA;<br>For each Data Type send FINISH DATA;<br>Transit to FINISH_DUMP; |
| START DUMP | RECV invalid message sequence number | Send DUMP request to Master<br>Transit to READY |
| DUMP_IN_PROGRESS | RECV DUMP request for one of the Data Types | if this is a new item then add to Database, otherwise modify existing one. |
| DUMP_IN_PROGRESS | RECV invalid message sequence number | Send DUMP request to Master<br>Transit to READY |
| FINISH DUMP | RECV FINISH request for one of the Data Types && !ALL Data Types FINISHED | Modify ALL_FINISHED to include replied peer<br>Send FINISH reply for this Data Type |
| FINISH DUMP | RECV FINISH request for one of the Data Types && ALL Data Types FINISHED | Send FINISH reply for this Data Type<br>Transit to READY |
| FINISH DUMP | RECV invalid message sequence number | Send DUMP request to Master<br>Transit to READY |

Master sends MARK request for each data type to this peer and transits to the START_DUMP state. When Standby receives mark request for one of the data types it transits to START_DUMP state, marks all existing elements of specified type and sends reply back to the Master. In its turn master delays start of dump until it receives MARK replies for all the Data Types. When all the replies are received Master transits to DUMP_IN_PROGRESS state and dumps all elements of its Database to the Standby peer. Standby receives DUMP message and updates its data in the Database and unmarks updated element. When DUMP is done Mater sends to Standby FINISH message and transits to the FINISH_DUMP state. After receiving FINISH message Standby transits to the FINISH_DUMP state, deletes all the elements in the Database, which are left marked and sends FINISH reply to the Master. Standby stays in this state until finish procedure done for all Data Types and then goes into READY STATE. Master remains in the FINISH state until FINISH replies are received for all Data Types. If Standby receives message with invalid sequence number it sends DUMP_REQUEST to the master and transits to READY state from the state where Standby was when message arrived. Upon receiving DUMP_REQUEST Master transits to START_DUMP state.

OMORIG on Master blade calls CBR 26 to update all known Standby Peers for every change in the Global Database. There are two types of changes: ADD and DELETE. When Standby receives ADD update it looks up in its replicated database for a requested data type by the specified ID. If the specified data item is found then it is modified with received information. If search fails then new data item is created and added to the database. On the DELETE request Standby finds requested data type and removes it without removing semantic dependencies. The OM on Master observes all semantic dependencies when it calls CBR to update a particular Data Type.

Standby Peer maintains simple FSM for flash updates as shown on FIG. 27.

Flash Updates as well as Bulk updates are sequential and loss of a message causes restart of the Dump procedure.

In one embodiment, to be absolutely sure that Standby OM Global Database is a mirror from the Master OM Global Database, periodic updates are used. Standby can run periodic update infrequently. Periodic update is based on the consistency rules checks. If one of the consistencies rules fails, then Standby requests Bulk update from the Master.

Consistency rules for OM Global Database are:

For every VPN there is a unique ID in the system.

For every VR there is a unique combination of the VPN ID and VR ID.

Every VR has a unique ID in the scope of VPN.

For every group there is a VR to which this group belongs.

For every object there is a group to which this object belongs.

Every object has a unique ID in the system.

Value of counter "Number of VRs in the VPN descriptor" is equal to total number of VRs per VPN.

Value of the counter "Number of objects in the group descriptor" is equal to the total number of objects in the group.

Total number of objects across all groups is equal to the total number of objects across address spaces, and it is equal to total number of objects in the system.

Number of objects in the sorted global list is equal to number of objects in the global hash, and it is equal to total number of objects in the system.

For every object class in the system there is a corresponding entry in the class table.

In one embodiment, the service provider's security staff consults with the customer in order to understand the corporate network infrastructure and to develop appropriate security policies (Note: this is a similar process to the CPE model). Once this has been accomplished, the NOC security staff remotely accesses the IP Service Processing Switch (using the Service Management System) at the regional POP serving the enterprise customer, and the firewall service is provisioned and configured remotely.

CONCLUSION

System 10 as described above enables the service provider to leverage the enterprise's existing services infrastructure (leased lines and Frame Relay PVCs) to deliver new, value-added services without the requirement of a truck roll. All firewall and VPN functionality resides on the IP Service Processing Switch at the POP, thus freeing the service provider from onsite systems integration and configuration and effectively hiding the technology from the enterprise customer. Firewall inspection and access control functions, as well as VPN tunneling and encryption, take place at the IP Service Processing Switch and across the WAN, while the enterprise's secure leased line or Frame Relay PVC access link remains in place. The customer interface is between its router and the IP Service Processing Switch (acting as an access router), just as it was prior to the rollout of the managed firewall service. Additionally, the customer has visibility into and control over its segment of the network via the CNM that typically resides at the headquarters site.

The network-based firewall model also enables service providers to quickly and cost-effectively roll out managed firewall solutions at all enterprise customer sites. As a result, secure Internet access can be provided to every site, eliminating the performance and complexity issues associated with backhauling Internet traffic across the WAN to and from a centralized secure access point. As the IP Service Delivery Platform is designed to enable value-added public network services, it is a carrier-grade system that is more robust and higher-capacity than traditional access routers, and an order of magnitude more scaleable and manageable than CPE-based systems. The platform's Service Management System enables managed firewall services, as well as a host of other managed network services, to be provisioned, configured, and managed with point-and-click simplicity, minimizing the need for expensive, highly skilled security professionals and significantly cutting service rollout lead-times. The Service Management System is capable of supporting a fleet of IP Service Processing Switches and tens of thousands of enterprise networks, and interfaces to the platform at the POP from the NOC via IP address. Support for incremental additional platforms and customers is added via modular software add-ons. Services can be provisioned via the SMS system's simple point and click menus, as well as requested directly by the customer via the CNM system. Deployment of a robust IP Service Delivery Platform in the carrier network enables service providers to rapidly turn-up high value, managed network-based services at a fraction of the capital and operational costs of CPE-based solutions. This enables service providers to gain a least-cost service delivery and support structure. Additionally, it enables them to gain higher margins and more market share than competitors utilizing traditional service delivery mechanisms—even while offering managed firewall services at a lower customer price point.

As enterprise customers gain confidence in the WAN providers' ability to deliver managed firewall services, a more scaleable and cost-effective service delivery model must be employed. Moving the intelligence of the service off of the customer premises and into the WAN is an effective strategy to accomplish this. Managed, network-based firewall services provide the same feature/functionality of a CPE-based service while greatly reducing capital and operational costs, as well as complexity.

The managed, network-based firewall service model enables WAN service providers to minimize service creation and delivery costs. This model virtually eliminates the need for onsite installation, configuration, and troubleshooting truck rolls, drastically reducing operational costs. This lower cost structure creates opportunities to increase revenues and/or gain market share by value-pricing the service. Services can be rapidly provisioned via a centralized services management system, shortening delivery cycles and enabling service providers to begin billing immediately. Additional services can be rapidly crafted and deployed via the same efficient delivery mechanism.

The network-based service model is a rapid and cost-effective way for service providers to deploy high-value managed firewall solutions. This model requires a comprehensive service delivery platform consisting of robust network hardware, an intelligent and scaleable services management system, and a feature-rich Customer Network Management (CNM) tool to mitigate customers' fears of losing control of network security.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method, comprising:
   providing a switch having a plurality of processor elements (PEs), each of the plurality of PEs running a network operating system (NOS), the NOS allowing the switch to create discrete customized services for customers of a service provider operating the switch by providing each customer with a customized configuration of service object groups;
   creating a system virtual router on a first PE of the plurality of PEs, wherein creating the system virtual router includes establishing a global object manager associated with the NOS of the first PE, the global object manager being responsible for managing global object groups and global object configurations; and
   configuring the plurality of PEs from the system virtual router, wherein configuring includes establishing, via the global object manager, a local object manager on each of the PEs, wherein the local object manager for a given PE of the plurality of PEs manages objects local to the given PE and transfers messages between objects on the given PE and between objects on the given PE and objects on other PEs of the plurality of PEs.

2. An article comprising a computer readable medium having instructions thereon, wherein the instructions, when executed in a computer, create a system for executing the method of claim 1.

3. The method of claim 1, wherein said configuring PEs of the plurality of PEs includes creating a customer virtual router from selected PEs on multiple blades of the switch, wherein creating a customer virtual router includes:
   establishing a virtual private network (VPN) associated with a customer;
   adding the customer virtual router to a list of virtual routers associated with the VPN; and
   creating an object associated with the customer virtual router on each of the selected PEs.

4. The method of claim 1, wherein said configuring the plurality of PEs includes:
   adding new PEs; and
   using a distributed management layer to group PEs into at least one virtual router, wherein grouping includes assigning a group identifier to selected objects in each PE such that the selected objects can be addressed as a group.

5. The method of claim 4, wherein using a distributed management layer to group processor elements into at least one virtual router includes:
   requesting the global object manager to create a virtual router from a group of PEs;
   requesting one or more of the local object managers to group the group of PEs;
   activating PEs of the group; and
   generating a status message that the at least one virtual router is created.

6. The method of claim 5, wherein said activating PEs of the group includes causing a state machine for a PE of the PEs of the group to enter an active state.

7. The method of claim 4, wherein said using a distributed management layer to group PEs includes adding object identifiers to a global object database.

8. The method of claim 1, wherein the customized configuration of service object groups associated with a first customer represent network resources of the switch sufficient to provide the first customer with network-based managed firewall services.

9. The method of claim 8, wherein the customized configuration of service object groups associated with the first customer further represent network resources of the switch sufficient to provide the first customer with virtual private network (VPN) services.

10. The method of claim 8, wherein the customized configuration of service object groups associated with a second customer represent network resources of the switch sufficient to provide the second customer with network-based managed firewall services.

11. The method of claim 10, wherein the customized configuration of service object groups associated with the second customer further represent network resources of the switch sufficient to provide the second customer with virtual private network (VPN) services.

12. A method comprising:
    providing a switch having a plurality of processor elements (PEs), each of the plurality of PEs running a network operating system (NOS);
    creating discrete customized services for each customer of a service provider operating the switch by providing each customer with a customized configuration of service object groups; and
    configuring and managing the service object groups by
      establishing a global object manager associated with the NOS of a first PE of the plurality of PEs, the global object manager being responsible for managing a global object database, global object groups and global object configurations;
      establishing, via the global object manager, a local object manager on each of the plurality of PEs; and
      each of the local object managers managing objects local to the corresponding PE of the plurality of PEs, including establishing object channels between objects residing in local and remote address spaces via connection end points supported by the NOS, each object channel representing a point-to-point asynchronous communications channel between a first object and a second object onto which services can be pushed.

13. The method of claim 12, further comprising configuring the plurality of PEs by
    creating a customer virtual router from selected PEs of the plurality of PEs on multiple blades of the switch;
    establishing a virtual private network (VPN) associated with a customer;
    adding the customer virtual router to a list of virtual routers associated with the VPN; and
    creating an object associated with the customer virtual router on each of the selected PEs.

14. The method of claim 13, wherein said configuring the plurality of PEs includes:
    adding new PEs; and
    using a distributed messaging layer of the NOS to group PEs into at least one virtual router, wherein grouping includes allowing selected objects in each PE to be addressed as a group by assigning a group identifier to the selected objects.

15. The method of claim 14, wherein said using a distributed messaging layer of the NOS to group PEs into at least one virtual router includes:

requesting the global object manager to create a virtual router from a group of PEs;

requesting one or more of the local object managers to group the group of PEs;

activating PEs of the group; and generating a status message that the at least one virtual router is created.

16. The method of claim 14, wherein said using a distributed messaging layer of the NOS to group PEs includes adding object identifiers to the global object database.

17. The method of claim 13, wherein the customized configuration of service object groups associated with a first customer represent network resources of the switch sufficient to provide the first customer with network-based managed firewall services.

18. The method of claim 17, wherein the customized configuration of service object groups associated with a second customer represent network resources of the switch sufficient to provide the second customer with network-based managed firewall services.

19. The method of claim 13, wherein the customized configuration of service object groups associated with the first customer further represent network resources of the switch sufficient to provide the first customer with virtual private network (VPN) services.

20. The method of claim 19, wherein the customized configuration of service object groups associated with the second customer further represent network resources of the switch sufficient to provide the second customer with virtual private network (VPN) services.

21. An article of manufacture comprising a computer-readable medium having instructions stored thereon, which when executed by one or more processors, cause the method of claim 13 to be performed.

* * * * *